(12) United States Patent
Kim et al.

(10) Patent No.: US 11,536,492 B2
(45) Date of Patent: Dec. 27, 2022

(54) ELECTRIC COMPRESSOR WITH IMPROVED INSULATION PERFORMANCE

(71) Applicant: LG Electronics Inc., Seoul (KR)

(72) Inventors: Joohyung Kim, Seoul (KR); Ochang Gwon, Seoul (KR); Bumsuk Kim, Seoul (KR); Yicheol Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 16/794,902

(22) Filed: Feb. 19, 2020

(65) Prior Publication Data

US 2020/0348050 A1 Nov. 5, 2020

(30) Foreign Application Priority Data

May 3, 2019 (KR) .................. 10-2019-0052426

(51) Int. Cl.
*H02K 1/20* (2006.01)
*H02K 5/08* (2006.01)
(Continued)

(52) U.S. Cl.
CPC .............. *F25B 1/005* (2013.01); *H02K 1/20* (2013.01); *H02K 5/08* (2013.01); *H02K 5/225* (2013.01);
(Continued)

(58) Field of Classification Search
CPC .......... H02K 1/14; H02K 1/146; H02K 1/185; H02K 1/20; H02K 3/30; H02K 3/32;
(Continued)

(56) References Cited

U.S. PATENT DOCUMENTS

| 2007/0273239 A1* | 11/2007 | Kobayashi | ............. H02K 1/185 310/216.044 |
|---|---|---|---|
| 2009/0324435 A1* | 12/2009 | Sears | ..................... H02K 3/522 310/215 |

(Continued)

FOREIGN PATENT DOCUMENTS

| CN | 201810512 U | 4/2011 |
|---|---|---|
| DE | 112015001426 T5 | 12/2016 |

(Continued)

OTHER PUBLICATIONS

European Search Report for European Application No. EP 20150712.6, dated Jul. 2, 2020, (9 pages).

(Continued)

*Primary Examiner* — Eric Johnson
(74) *Attorney, Agent, or Firm* — Birch, Stewart, Kolasch & Birch, LLP

(57) ABSTRACT

The present disclosure provides an electric compressor comprising a main housing, a motor part disposed in the main housing and comprising a stator comprising a rotor accommodating portion and a rotor rotatably disposed in the rotor accommodating portion, a compression part rotatably connected to the motor part, and an inverter part electrically connected to the motor part. The motor part is disposed in a motor room formed inside the main housing, the stator comprises a plurality of insulating protrusions protruding from an outer circumferential surface of the stator, and the plurality of insulating protrusions is configured to be brought into contact with an inner circumferential surface of the motor room.

18 Claims, 14 Drawing Sheets

(51) Int. Cl.
  *H02K 5/22* (2006.01)
  *H02K 5/24* (2006.01)
  *H02K 7/14* (2006.01)
  *H02K 9/22* (2006.01)
  *F25B 1/00* (2006.01)
  *H02K 11/33* (2016.01)

(52) U.S. Cl.
  CPC .................. *H02K 5/24* (2013.01); *H02K 7/14* (2013.01); *H02K 11/33* (2016.01); *H02K 9/227* (2021.01)

(58) Field of Classification Search
  CPC .......... H02K 3/325; H02K 3/34; H02K 3/345; H02K 5/08; H02K 5/225; H02K 5/24; H02K 7/14; H02K 11/30; H02K 11/33
  See application file for complete search history.

(56) References Cited

U.S. PATENT DOCUMENTS

| | | |
|---|---|---|
| 2013/0259674 A1 | 10/2013 | Sears et al. |
| 2017/0292517 A1 | 10/2017 | Lee et al. |
| 2018/0183281 A1* | 6/2018 | Repentin .................. H02K 9/14 |
| 2018/0351428 A1* | 12/2018 | Okamoto .................. H02K 3/28 |
| 2019/0363607 A1* | 11/2019 | Guntermann .......... H02K 5/225 |
| 2019/0390679 A1* | 12/2019 | Guntermann ............ H02K 5/10 |

FOREIGN PATENT DOCUMENTS

| | | | |
|---|---|---|---|
| JP | 2006-191702 A | | 7/2006 |
| JP | 2006191702 A | * | 7/2006 |
| JP | 2016-200122 A | | 12/2016 |
| JP | 2016200122 A | * | 12/2016 |
| KR | 20-0143541 Y1 | | 5/1998 |
| KR | 10-0396780 B1 | | 6/1999 |
| KR | 10-2009-0021639 A | | 3/2009 |
| KR | 10-1262901 B1 | | 5/2013 |
| KR | 20170053477 A | * | 5/2017 |
| KR | 10-2017-0087718 A | | 7/2017 |
| KR | 10-2017-0139392 A | | 12/2017 |
| KR | 10-2018-0023166 A | | 3/2018 |

OTHER PUBLICATIONS

Korean Office Action for Korean Application No. 10-2019-0052426, dated Jul. 2, 2020, (5 pages).

* cited by examiner

ELECTRIC COMPRESSOR WITH IMPROVED INSULATION PERFORMANCE

CROSS-REFERENCE TO RELATED APPLICATION

This application claims the benefit of priority under 35 U.S.C. § 119(a) to Korean Patent Application No. 10-2019-0052426, filed on May 3, 2019, the disclosure of which is incorporated by reference herein in its entirety.

BACKGROUND

1. Technical Field

This disclosure relates to an electric compressor, and in some embodiments, to an electric compressor capable of effectively reducing vibration occurred in a motor and obtaining improved insulation performance.

2. Description of the Related Art

Compressors that compress refrigerant in vehicle air conditioning systems have been developed in various forms. Recently, along with the trend of electrification of vehicle components, electric compressors which are driven by an electric motor have been actively developed.

An electric compressor mainly employs a scroll compression method suitable for a high compression ratio operation. Such a scroll-type electric compressor (hereinafter, referred to as "electric compressor") is provided with a motor part, a compression part, and a rotational shaft connecting the motor part and the compression part.

Specifically, the motor part is configured as a rotary motor or the like and provided in a hermetic casing. The compression part is located at one side of the motor part, and includes a fixed scroll and an orbiting scroll. The rotational shaft is configured to transmit a rotational force of the motor part to the compression part.

A refrigerant compressed in the compression part is discharged to outside of the electric compressor through an exhaust port. The discharged refrigerant is utilized for operating a vehicle air conditioning system.

The motor part includes a stator and a rotor. A plurality of coils is wound on the stator. In addition, the rotor is provided with a magnet. The magnet provided in the rotor is generally a permanent magnet.

When power is applied to the motor part, a magnetic field is formed by the plurality of coils wound around the stator. The formed magnetic field exerts electromagnetic force on the magnet provided on the rotor. Accordingly, the rotor with the magnet is rotated according to the strength and direction of the electromagnetic force.

In recent years, demands for electric vehicles have rapidly increased, and developments for increasing a travel distance (driving distance) have been actively conducted. Several factors have to be considered to increase the travel distance of the electric vehicle. An increase in compression capacity of the electric compressor is also one of the factors to be considered.

As one method for increasing the capacity of the electric compressor, a method of applying a high voltage to the electric compressor, for example, may be explained. When high input power is applied, the output of the electric compressor may also be increased accordingly.

However, when a high voltage is applied to the motor part, a rotation speed, the number of turns (revolution) and the like are increased. As the high voltage is applied, the possibility that an unintended current leakage occurs goes up. In addition, heat is more generated as the motor part operates.

Therefore, in order to prevent this, an insulation distance is generally ensured by spacing the motor part apart from an inverter applying power to the motor part and the compression part.

However, this insulation distance should be increased as the magnitude of a voltage applied to the motor part is increased. This may cause an increase in an overall size of the electric compressor.

In addition, when the electric compressor is operated by a high voltage, more vibration may be generated than when the electric compressor is operated by a low voltage. The generated vibration is transmitted to an inverter part accommodating an inverter device which may be easily damaged due to heat and impact, which may cause failure and damage of the inverter device.

Accordingly, technologies for reducing vibration inside the electric compressor and improving insulation performance have been introduced.

Korean Patent Registration Application No. 10-0396780 discloses a scroll compressor having a structure that can reduce vibration of the compressor. Specifically, the patent document discloses a scroll compressor having a structure capable of preventing vibration occurred in a driving motor from being transferred from an inner casing accommodating the driving motor therein to an outer casing, by way of connecting the outer casing and the inner casing using an elastic member.

However, this type of scroll compressor can reduce the vibration to some extent according to the operation of the driving motor, but has a limitation in that there is no consideration about a method of preventing leakage of heat and current generated in response to the operation of the driving motor.

Korean Utility Model Registration No. 20-0143541 discloses an insulation device for a compressor. Specifically, the patent document discloses an insulation device for a compressor having a structure capable of preventing coil slippage, by way of forming a plurality of bent portions on an insulator wound with the coil in an axial direction of the insulator.

However, the insulation device of the compressor of this type can prevent the coil slippage, but has a limitation in that there is no consideration about an insulation structure, irrespective of the outside of the stator, namely, the coil slippage. In addition, there is a difficulty in finding a solution for vibrations that may occur as the electric compressor operates.

PRIOR ART DOCUMENTS

Patent Documents

Korean Patent Registration Application No. 10-0396780 (Sep. 2, 2003)
Korean Utility Model Registration No. 20-0143541 (Jun. 15, 1999)

SUMMARY

The present disclosure is directed to providing an electric compressor having a structure that can solve the above-mentioned problems.

First, one aspect of the present disclosure is to provide an electric compressor having a structure, capable of effectively dissipating heat generated in a motor part and effectively preventing current leakage, without increasing a size of the electric compressor.

Another aspect of the present disclosure is to provide an electric compressor having a structure, which is simplified and capable of effectively dissipating heat generated in a motor part and effectively preventing current leakage.

Still another aspect of the present disclosure is to provide an electric compressor having a structure, which can be easily fabricated, effectively dissipate heat generated in a motor part, and effectively prevent current leakage.

Still another aspect of the present disclosure is to provide an electric compressor having a structure, capable of effectively reducing vibration generated as the motor part operates.

Still another aspect of the present disclosure is to provide an electric compressor having a structure, capable of effectively dissipating heat generated in a motor part by using refrigerant introduced into the electric compressor.

Still another aspect of the present disclosure is to provide an electric compressor having a structure, capable of simplifying an electric connection between a motor part and an inverter device.

Still another aspect of the present disclosure is to provide an electric compressor having a structure, capable of facilitating a stator, a rotor and a member for insulation, all constructing a motor part, to be assembled in a correct direction.

Still another aspect of the present disclosure is to provide an electric compressor having a structure, capable of facilitating installation of a motor part in a housing.

In order to achieve the above aspects and other advantages according to the embodiments, there is provided an electric compressor, comprising a main housing extending in a lengthwise direction, a motor part disposed in the main housing and comprising a stator comprising a rotor accommodating portion, and a rotor rotatably disposed in the rotor accommodating portion of the stator, a compression part rotatably connected to the motor part and configured to receive a rotational force from the motor part and compress a refrigerant, and an inverter part electrically connected to the motor part and configured to apply power to the stator. The motor part may be disposed in a motor room formed inside the main housing. The stator may comprise a plurality of insulating protrusions protruding from an outer circumferential surface of the stator to increase a surface area of the outer circumferential surface. The plurality of insulating protrusions may be configured to be brought into contact with an inner circumferential surface of the motor room.

The outer circumferential surface of the stator of the electric compressor may comprise a first region comprising the plurality of insulating protrusions is spaced apart from one another by a predetermined distance, and a second region comprising adjacent insulating protrusions, among the plurality of insulating protrusions, spaced apart from each other by another predetermined distance different from the predetermined distance.

Here, a coupling protrusion may be configured to protrude from the inner circumferential surface of the motor room. The coupling protrusion may be configured to allow the plurality of insulating protrusions to be brought into contact, and may be inserted into a coupling space formed between the adjacent insulating protrusions located in the second region and spaced apart from each other by the another predetermined distance.

The stator of the electric compressor may have a cylindrical shape extending in a lengthwise direction thereof. The plurality of insulating protrusions may be configured to extend from the outer circumferential surface of the stator in the lengthwise direction of the stator, so that a refrigerant flows from the motor part toward the compression part through spaces formed by the plurality of insulating protrusions spaced apart from one another.

An insulating unit may be coupled to an end portion of the stator in the lengthwise direction of the stator. The insulating unit may be configured to insulate the stator and may comprise a cross-section corresponding to the stator.

The stator of the electric compressor may comprise a coupling groove recessed by a predetermined distance into one side surface of the stator facing the insulating unit, and the insulating unit may comprise a coupling protrusion protruding by the predetermined distance from one side surface of the insulating unit facing the stator. The coupling protrusion may be configured to be inserted into the coupling groove.

The stator of the electric compressor may comprise an outer circumferential portion defining an outer circumference of the stator, and a plurality of teeth protruding radially inward from the outer circumferential portion of the stator. A plurality of coupling grooves may be provided on one side surface of each of the plurality of teeth facing the insulating unit. A number of the plurality of coupling grooves formed in one of the plurality of teeth may be different from a number of the plurality of coupling grooves formed in another one of the plurality of teeth.

The insulating unit of the electric compressor may comprise an insulation outer circumferential portion defining an outer circumference of the insulating unit; and a plurality of insulating teeth protruding radially inward from the insulation outer circumferential portion of the insulating unit. A plurality of coupling protrusions may be provided on one side surface of each of the plurality of insulating teeth facing the stator. A number of the plurality of coupling protrusions formed on one of the plurality of insulating teeth may be different from a number of the plurality of coupling protrusions formed on another one of the plurality of insulating teeth.

An insulating housing configured to cover the insulating unit may be coupled to an end portion of the stator, to which the insulating unit is coupled, in the lengthwise direction of the stator.

A coupling key may protrude from one side of the insulating housing facing the insulating unit, and a coupling slot may be recessed into one side of the insulating unit facing the insulating housing. The coupling key may be configured to be inserted into the coupling slot when the insulating housing covers the insulating unit.

The electric compressor may further comprise a connector unit configured to electrically connect the inverter part and the motor part. The connector unit may include a support member defining a body of the connector unit, and an electric member coupled to the support member in a penetrating manner. One side of the electric member may be electrically connected to the inverter part and another side of the electric member may be electrically connected to the motor part.

The electric compressor may further include a terminal unit detachably coupled to the another side of the electric member and configured to electrically connect the connector unit and the motor part. An insulating unit and an insulating housing covering the insulating unit and electrically connected to the stator may be sequentially coupled to each end portion of the stator in the lengthwise direction of the stator, and a terminal accommodating may be disposed in one side of the insulating housing facing the inverter part. The insulating unit may be configured to insulate the stator and may comprise a cross-section corresponding to the stator. The terminal accommodating portion may comprise a space configured to accommodate the terminal unit.

A connector coupling portion may be disposed on one side of the inverter part facing the motor part. The connector unit may be detachably coupled to the connector coupling portion. The connector coupling portion may comprise a support member insertion groove recessed by a predetermined distance. The support member may be configured to be coupled to the support member insertion groove. An electric member insertion opening may be formed in a penetrating manner, and one side of the electric member may be configured to be inserted in the electric member insertion opening One side of the insulating housing facing the inverter part may be configured to be brought into contact with one side of the inverter part facing the motor part when the connector unit is detachably coupled to the connector coupling portion.

The insulating housing may comprise a housing outer circumferential portion formed in a ring shape and defining a body of the insulating housing. A snap protrusion may be configured to protrude radially inward from one end portion of the housing outer circumferential portion facing the stator. The insulating unit may comprise an insulation outer circumferential portion defining an outer circumference of the insulating unit. A snap coupling portion may be recessed radially inward from one end portion of the insulation outer circumferential portion facing the stator. The snap protrusion may be fitted to the snap coupling portion when the insulating housing is coupled the insulating unit.

According to the present disclosure, the following effects can be obtained.

First, insulating units may be provided on both end portions of a stator in a lengthwise direction of the stator. The insulating unit may be configured to prevent heat generated in the stator from being transferred to outside. The insulating unit may also be configured to prevent unintended current leakage from the stator.

Accordingly, heat and current generated in a motor part can be effectively prevented from being transmitted to outside, even without increasing a spaced distance between the stator and an inverter part and a spaced distance between the stator and a compression part.

The insulating units may also be coupled to both end portions of the stator in the lengthwise direction of the stator. Insulating housings may be configured to cover the insulating units and are coupled to the both end portions of the stator in the lengthwise direction of the stator. That is, the motor part itself may be provided with members for improving an insulation effect.

Therefore, since a separate member is not necessary to be provided inside a main housing, the electric compressor can be simplified in structure and can effectively prevent heat and current generated in the motor part from being transferred to outside.

In addition, even if the insulating units and the insulating housings are coupled to the stator, an overall structure of the motor part may not be greatly changed. Therefore, the existing facilities for manufacturing a motor part can be used.

Accordingly, a separate facility for producing the motor part may not be needed, thereby enhancing productivity and manufacturing economic efficiency can be improved.

In addition, the insulating housings configured to cover the stator may be formed of a material having predetermined elasticity. Vibration generated due to an operation of the motor part can be absorbed by the insulating housings.

Therefore, even if the motor part does not secure a sufficient insulating distance from the inverter part, the compression part or an inner surface of the housing, vibration generated in the motor part can be effectively reduced.

In addition, a plurality of insulating protrusions may be spaced apart from one another by predetermined distances on an outer circumferential surface of the stator. A predetermined space may be formed between the insulating protrusions adjacent to each other, so that a refrigerant can flow.

Accordingly, the refrigerant introduced into the electric compressor can absorb heat generated in the motor part while flowing toward the compression part. In this manner, since the motor part can be cooled by the refrigerant to be compressed, heat generated in the motor part can be effectively dissipated.

In addition, the motor part may be electrically connected to an inverter device through an electric connection unit. The electric connection unit may be detachably coupled to the inverter device. In addition, the electric connection unit may also be detachably coupled to an insulating housing.

Therefore, complicated wiring may not be necessary for electric connection between the motor part and the inverter device. In addition, since the electric connection unit is electrically coupled to the inverter device and the motor part, a simple connection and disconnection may be allowed.

In addition, the stator may be provided with a stator coupling portion, the insulating unit may be provided with an insulation coupling portion, and the insulating housing may be provided with a housing coupling portion. Each coupling portion may comprise the stator, the insulating unit and the insulating housing to be coupled together in a specific direction, namely, in an accurate direction.

Therefore, even when the stator, the insulating unit and the insulating housing are formed in a circular shape that is difficult to distinguish directions, the stator, the insulating unit and the insulating housing may be coupled together only when they are aligned in the specific direction by the coupling portions. This may facilitate assembly of the motor part.

In addition, as insulating protrusions are spaced apart from each other, a coupling space may be formed in an outer circumferential surface of the stator, which may define an outer surface of the motor part. In addition, a coupling protrusion may be formed inside a motor room to correspond to the coupling space.

Accordingly, the stator can be accommodated in the motor room only in a direction in which the coupling protrusion is inserted into the coupling space. This may facilitate the motor part to be accommodated in the motor room.

DETAILED DESCRIPTION OF THE EMBODIMENTS

Hereinafter, description will be given in detail of an electric compressor 10 in accordance with an embodiment disclosed herein, with reference to the accompanying drawings.

In the following description, description of several components will be omitted in order to clarify the technical features of this disclosure.

It will be understood that when an element is referred to as being "connected with" another element, the element can be connected with the another element, or intervening elements may also be present.

In contrast, when an element is referred to as being "directly connected with" another element, there are no intervening elements present.

A singular representation may include a plural representation unless it represents a definitely different meaning from the context.

The term "refrigerant" as used herein means any medium that takes heat away from a low-temperature object and transports it to a high-temperature object. In one embodiment, the refrigerant may be carbon dioxide ($CO_2$), R134a, R1234yf, and the like.

As used herein, the term "insulation" means blocking conduction of electricity or heat. In addition, the term "insulating material" used herein means any material having the aforementioned insulation properties. In one embodiment, the insulating material may be synthetic resin such as PE or the like.

Figure 1:
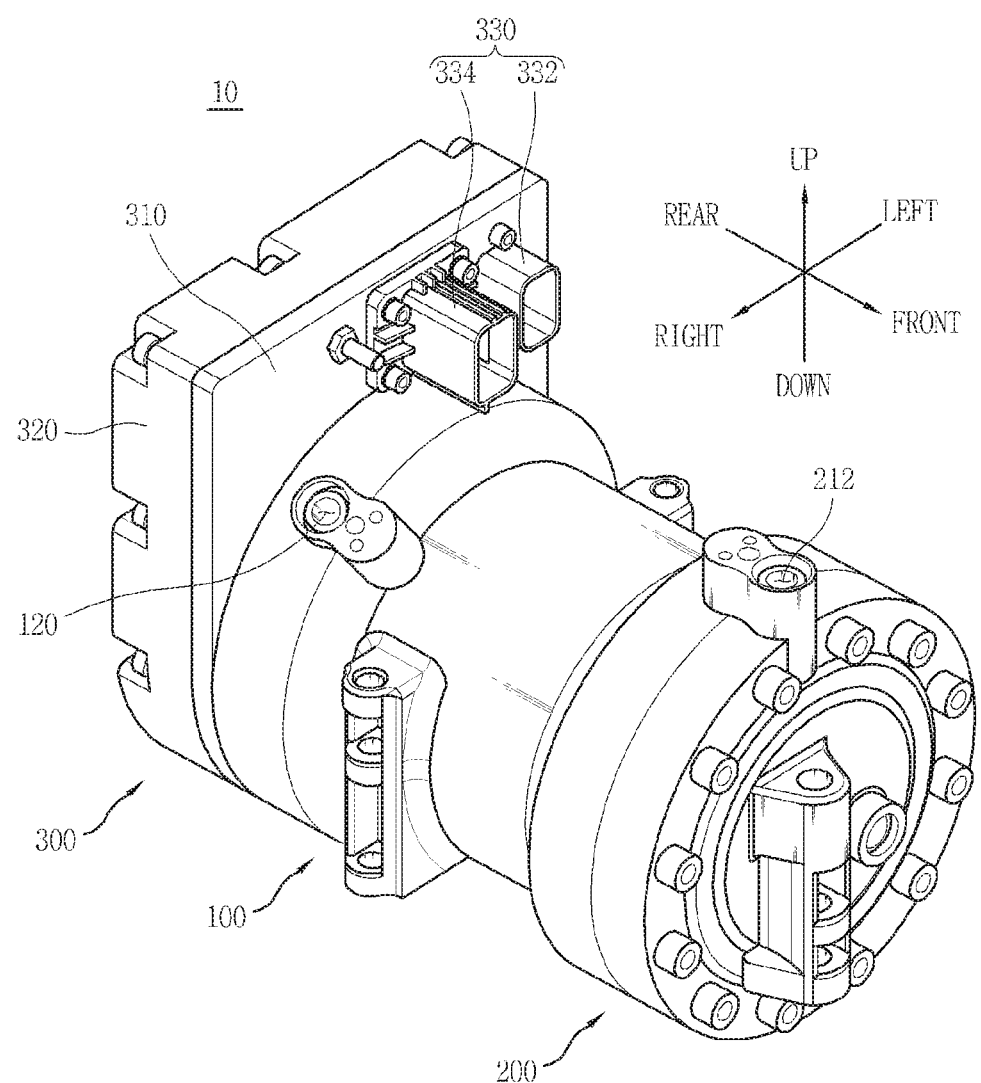
FIG. 1 is a perspective view of an electric compressor in accordance with an embodiment of the present disclosure.
Figure 3:
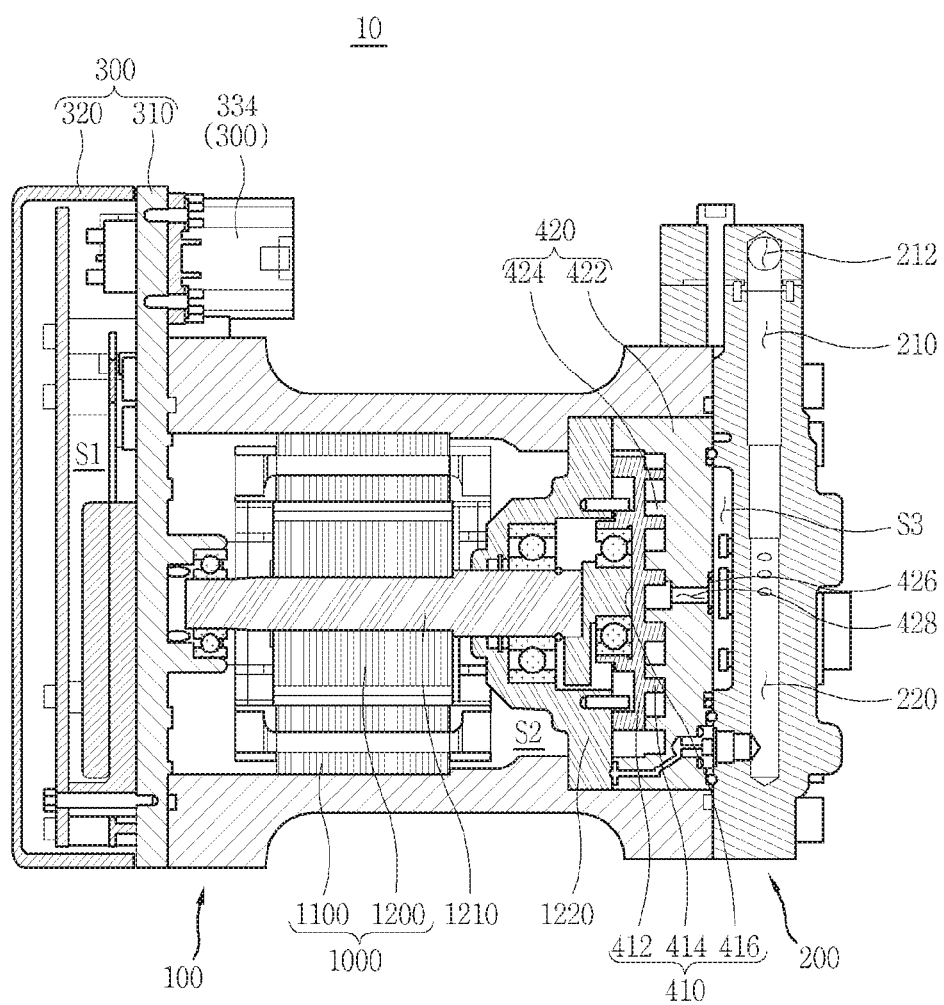
FIG. 3 is a sectional view of the electric compressor of FIG. 1 in accordance with an embodiment of the present disclosure.
Figure 4:
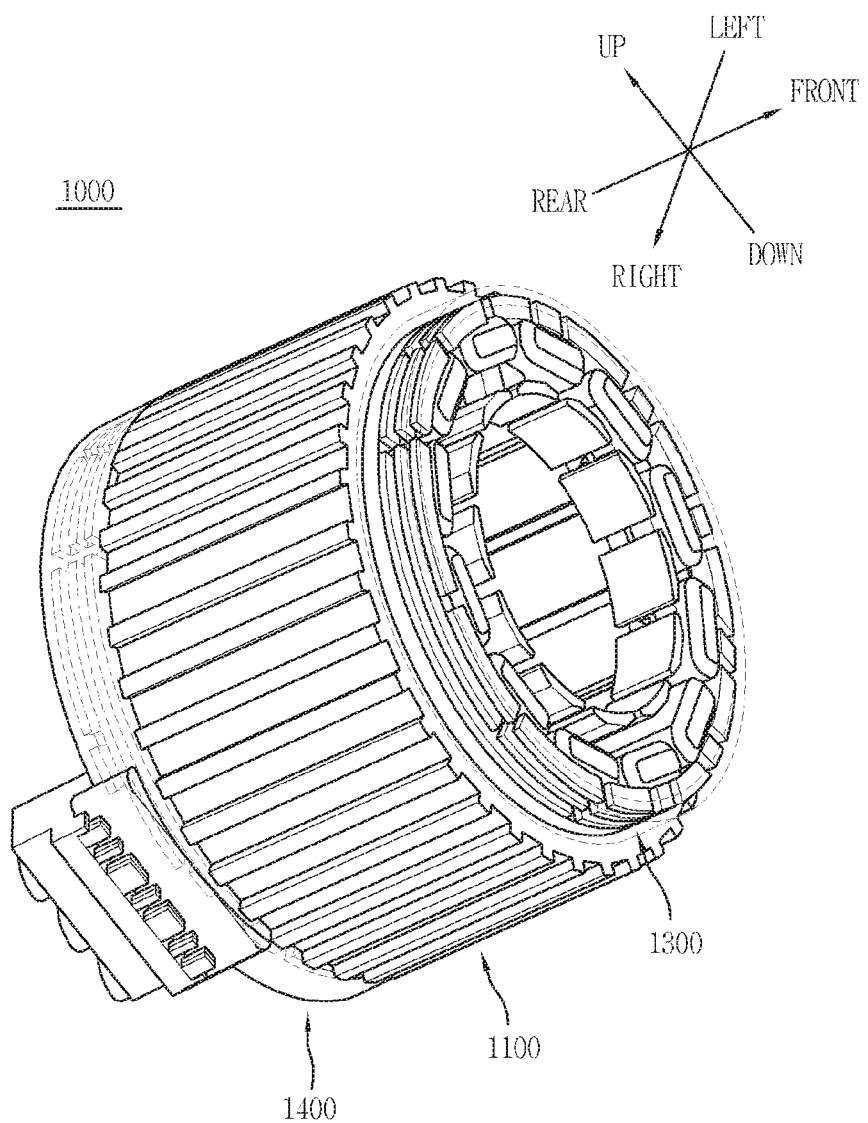
FIG. 4 is a coupled perspective view of a motor part provided in the electric compressor of FIG. 1 in accordance with an embodiment of the present disclosure.

The terms "front side", "rear side", "upper side", "lower side", "right side" and "left side" as used herein will be understood with reference to a coordinate system illustrated in FIGS. 1 and 3.

An electric compressor 10 according to an embodiment of the present disclosure may comprise a main housing 100, a rear housing 200, an inverter part 300, a compression part 400, and a motor part 1000.

Figure 2:
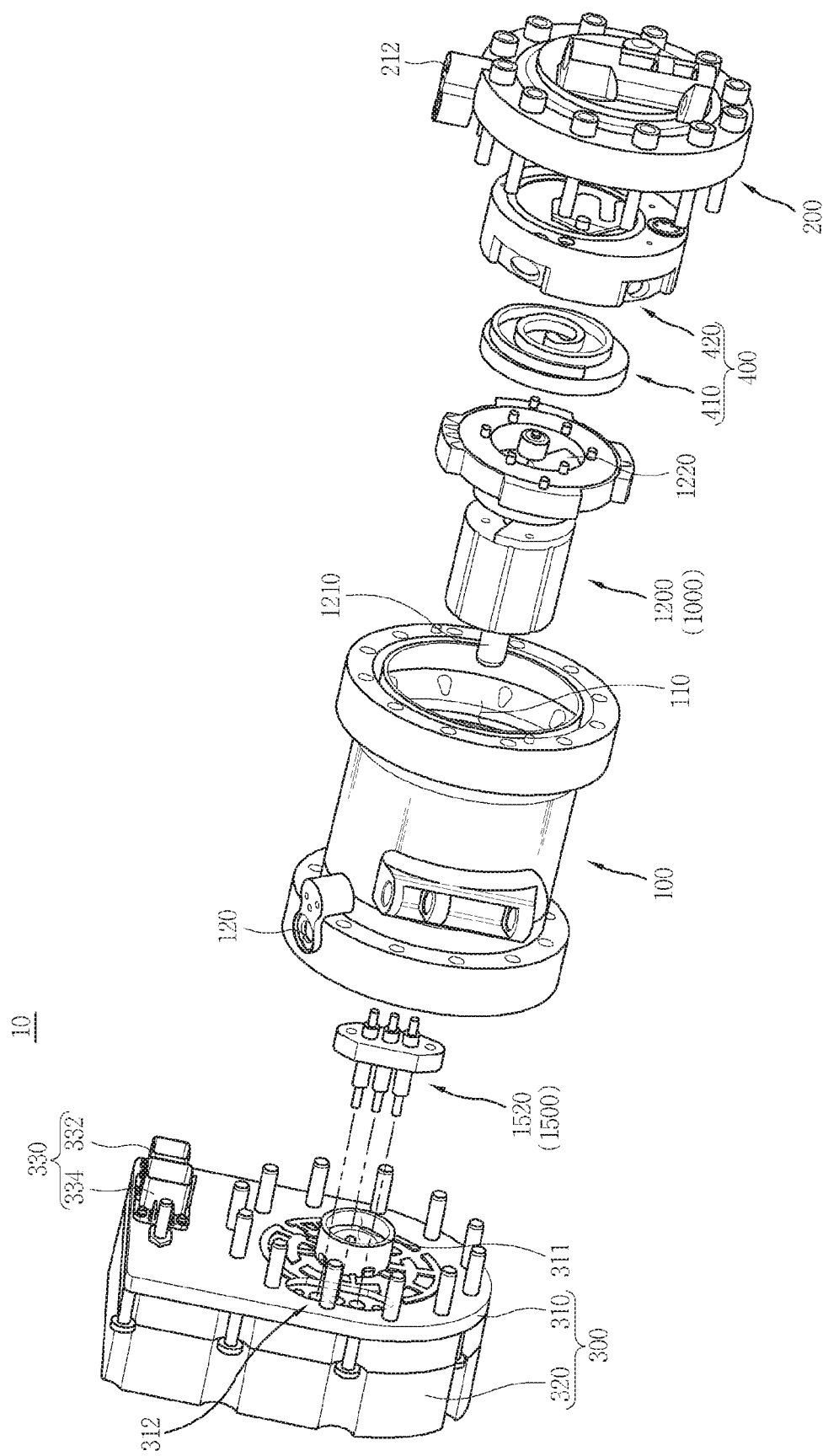
FIG. 2 is an exploded perspective view of the electric compressor of FIG. 1 in accordance with an embodiment of the present disclosure.

Hereinafter, each configuration of the electric compressor 10 according to the embodiment will be described with reference to FIGS. 1 to 3, but the motor part 1000 will be described separately.

The main housing 100 may define part of an appearance of the electric compressor 10. In addition, the main housing 100 may form a body of the electric compressor 10, and may comprise an inner space so that components or devices provided in the electric compressor 10 can be accommodated therein.

In detail, a compression part 400 and a motor part 1000 may be accommodated in the inner space of the main housing 100.

The main housing 100 may be formed in a cylindrical shape which may be long in a lengthwise direction, namely, in a back-and-forth direction in the illustrated embodiment. The main housing 100 may be of any shape that can accommodate the components of the electric compressor 10 therein.

However, considering that a refrigerant introduced into the main housing 100 is compressed at high pressure, the main housing 100 may be formed in a cylindrical shape having high pressure resistance.

A rear housing 200 to be described later may be connected to one side of the main housing 100 in the lengthwise direction, namely, to a front side of the main housing 100 in the illustrated embodiment, so that a fluid can flow.

In an embodiment not shown, a fixed scroll 420 of the compression part 400 may be coupled to the front side of the main housing 100 so as to be exposed. That is, the main housing 100, the fixed scroll 420, and the rear housing 200 may be connected in sequence so that the fluid can flow.

The refrigerant introduced into the main housing 100 may be compressed by the compression part 400 and then introduced into a discharge chamber S3 through a discharge port 428 formed in the fixed scroll 420.

The inverter part 300 may be electrically connected (i.e., connected so that current can flow) to another side of the main housing 100 in the lengthwise direction, namely, to the rear side in the illustrated embodiment.

Power and control signal applied from the inverter part 300 may be transmitted to the motor part 1000, so as to control the motor part 1000 to generate a rotational force for the compression part 400 to compress a refrigerant.

The main housing 100 may comprise a motor room 110 and an intake port 120.

The motor room 110 may comprise a space in which the motor part 1000 can be accommodated. The motor room 110 may be defined as an inner space of the main housing 100.

The motor room 110 may be partitioned by an inner circumferential surface of the main housing 100. That is, the motor room 110 may comprise a space surrounded by the inner circumferential surface of the main housing 100. Alternatively, the motor room 110 may be provided as a separate housing which is accommodated in the main housing 100 and has an inner space.

The motor part 1000 to be described later may be accommodated in the motor room 110 such that an outer circumferential surface 1121 of the stator 1100 can be brought into contact with an inner circumferential surface of the motor room 110.

The motor part 1000 may be configured such that the outer circumferential surface 1121 of the stator 1100 is fixed to an inner circumferential surface of the main housing 100, that is, an inner circumferential surface of the main housing 100 that partitions the motor room 110. Accordingly, even when power and control signal are applied to the motor part 1000 from the inverter part 300, the stator 1100 may not rotate.

Figure 13:
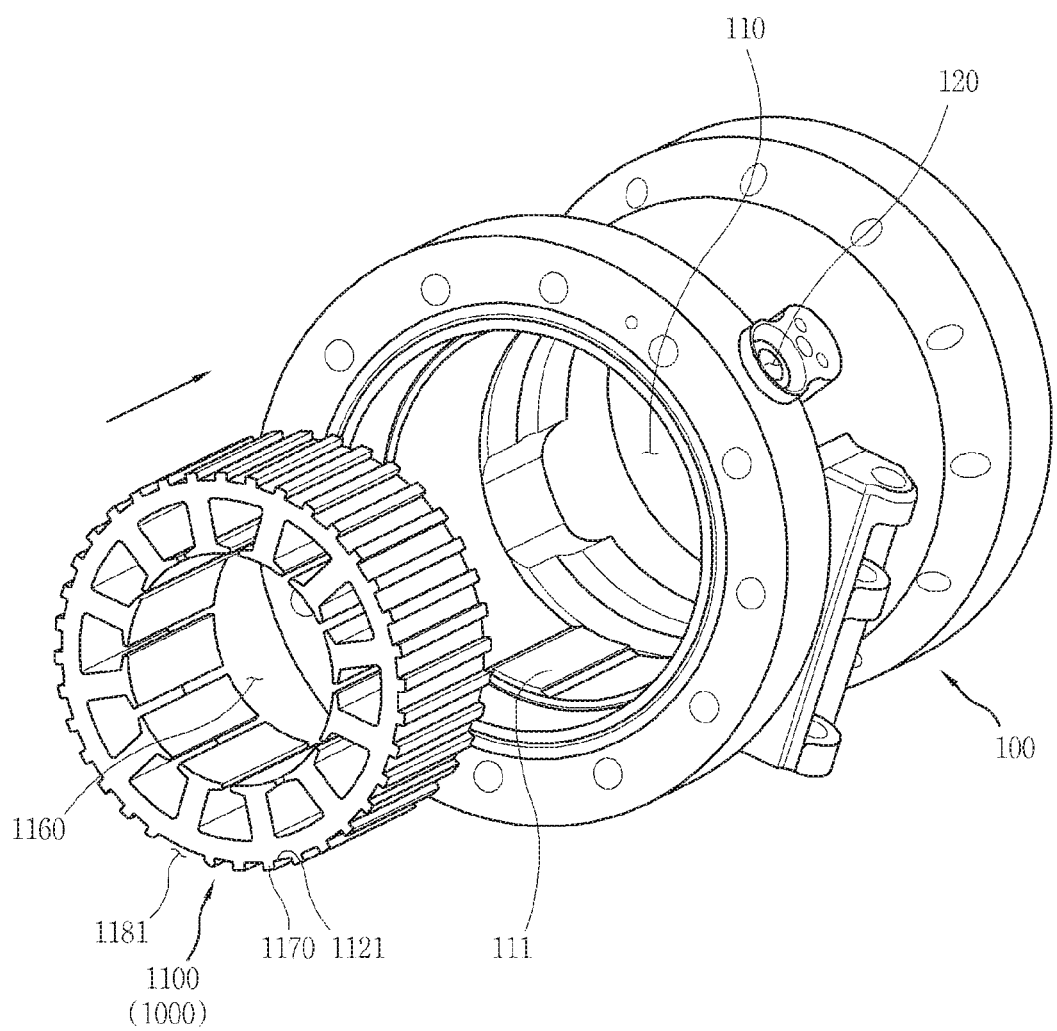
FIG. 13 is an exploded perspective view illustrating a coupling relationship between a motor part and a housing in accordance with an embodiment of the present disclosure.

A coupling protrusion 111 may protrude from the inner circumferential surface of the motor room 110 (see FIG. 13). The coupling protrusion 111 may be inserted into a coupling space 1181 of the stator 1100 of the motor part 1000. Accordingly, when the stator 1100 is accommodated in the motor room 110, the stator 1100 may not be rotated relative to the main housing 100.

A size and shape of the coupling protrusion 111 may be formed to be complementary to a size and shape of the coupling space 1181. However, a position of the coupling protrusion 111 may be preferably asymmetrical on the inner circumferential surface of the motor room 110.

Specifically, in the illustrated embodiment, the motor room 110 may be formed in a cylindrical shape having a circular cross-section which may be the same as the shape of the main housing 100. The coupling protrusion 111 may be formed at least one position on the inner peripheral surface of the motor room 110.

At this time, a shape or number of a coupling protrusion 111 formed at any one position on the inner circumferential surface of the motor room 110 may be different from a shape or number of a coupling protrusion 111 formed at another position.

This is to ensure that a specific coupling protrusion 111 may be inserted only into the coupling space 1181 formed in the stator 1100 when the stator 1100 is inserted into the motor room 110. Accordingly, the stator 1100 can be inserted into the motor room 110 in a predetermined direction, thereby facilitating the coupling.

The intake port 120 may allow the inside and the outside of the main housing 100 to communicate with each other. A refrigerant may flow into the main housing 100 through the intake port 120. The introduced refrigerant may be compressed while sequentially passing through the motor room 110, a back pressure chamber S2, and a discharge chamber S3, and may be discharged to outside of the electric compressor 10 through an exhaust port 212 to be described later.

The intake port 120 may be located on an outer circumferential surface of one side of the main housing 100 that opposes the rear housing 200, namely, the rear side of the main housing in the illustrated embodiment.

In addition, the intake port 120 may be formed as a circular through hole formed from outside to inside of the main housing 100 in a penetrating manner.

The position and shape of the intake port 120 may be determined to be any position and shape allowing the inside and outside of the main housing 100 to communicate with each other through the intake port 120.

However, the intake port 120 may be located adjacent to the inverter part 300, considering that a large amount of heat is generated in an inverter device accommodated in the inverter part 300, which will be described later, and a refrigerant introduced into the main housing 100 partially plays a role of cooling the generated heat.

The rear housing 200 may define a part of an appearance of the electric compressor 10. Specifically, the rear housing 200 may be located at one side of the main housing 100, namely, at the front side of the main housing 100 in the illustrated embodiment, to define the appearance of the electric compressor 10 together with the main housing 100.

Alternatively, a fixed scroll 420 may be provided between the main housing 100 and the rear housing 200.

The rear housing 200 may communicate with the main housing 100. A refrigerant introduced into the main housing 100 through the intake port 120 of the main housing 100 may be compressed in the compression part 400 and then introduced into the rear housing 200.

In the illustrated embodiment, the rear housing 200 may be formed in a shape of a cap having a circular cross-section. The shape of the rear housing 200 may change, but such change may preferably be made to correspond to the shape of the main housing 100.

The rear housing 200 and the main housing 100 may be hermetically coupled to each other by a separate coupling member (not shown).

The rear housing 200 may comprise an exhaust passage 210 and an oil discharge passage 220.

The exhaust passage 210 may be a passage through which the refrigerant compressed in the compression part 400 can be discharged. The exhaust passage 210 may communicate with the discharge chamber S3.

In addition, an exhaust port 212 through which the inside and outside of the rear housing 200 can communicate with each other may be formed at one end portion of the exhaust passage 210, namely, at an upper end portion in the illustrated embodiment. In one embodiment, the exhaust port 212 may be formed as a through hole.

The refrigerant compressed in the compression part 400 may pass through the discharge chamber S3 and may enter the exhaust passage 210. At this time, the refrigerant introduced into the exhaust passage 210 may be in a mixed state with oil. When oil remains in the refrigerant discharged through the exhaust port 212, cooling efficiency of an air conditioning system may be lowered, or damage to the air conditioning system itself may be caused.

Accordingly, a cyclone device (not shown) configured to separate refrigerant and oil may be provided in the exhaust passage 210.

The oil discharge passage 220 may communicate with the exhaust passage 210. Oil separated from the refrigerant in the exhaust passage 210 or a remaining mixture of the refrigerant and the oil may flow to a lower side of the rear housing 200 through the oil discharge passage 220.

The oil discharge passage 220 may communicate with an oil passage (not shown). The oil or the remaining mixture of the refrigerant and the oil moved to the lower side of the rear housing 200 may then be moved back to the compression part 400 through the oil passage (not shown).

The inverter part 300 may be configured to control an operation of the electric compressor 10. The inverter part 300 may control the operation of the electric compressor 10 by applying or cutting power and control signal to or from the motor part 1000.

The inverter part 300 may be configured to receive power and control signal from outside, and transmit them to the motor part 1000. To this end, the inverter part 300 may be electrically connected to the motor part 1000.

As will be described later, the electric compressor 10 according to an embodiment disclosed herein may comprise an electric connection unit 1500 for electrically connecting the inverter part 300 and the motor part 1000, which may facilitate the connection between the inverter part 300 and the motor part 1000.

The inverter part 300 may comprise an inverter device (not shown) therein. Specifically, the inverter device (not shown) may be accommodated in an inverter chamber S1 that is defined as a space formed between an inverter housing 310 and an inverter cover 320 which may be coupled to each other.

The inverter device (not shown) may be configured to receive power and control signal from outside and to transfer them to the motor part 1000. In one embodiment, the inverter device (not shown) may include an inverter element (not shown) including an Insulated Gate Bipolar Transistor (IGBT) and the like.

The inverter part 300 may be located at one side of the main housing 100. The inverter part 300 may be located at one side of the main housing 100 opposite to the rear housing 200, namely, at the rear side of the main housing 100 in the illustrated embodiment.

The inverter part 300 may be disposed at an arbitrary position at which it can receive power and control signal from outside and apply them to the motor part 1000.

In an embodiment not shown, the inverter part 300 and the main housing 100 may communicate with each other. In the above embodiment, a refrigerant introduced through the intake port 120 may directly cool the inverter element (not shown) accommodated in the inverter part 300.

The inverter part 300 may comprise an inverter housing 310, an inverter cover 320, and a connector portion 330. In addition, although not shown, the inverter part 300 may comprise a printed circuit board (not shown), an inverter bracket (not shown), and an inverter element (not shown).

The inverter housing 310 may define an appearance of the inverter part 300 together with the inverter cover 320.

The front side of the inverter housing 310 may be coupled to the main housing 100. In other words, the inverter housing 310 may be a portion where the inverter part 300 is coupled to the main housing 100.

The inverter housing 310 may be formed of a material having high thermal conductivity so as to cool the inverter device (not shown) accommodated in the inverter part 300. The refrigerant introduced through the intake port 120 may cool the inverter device (not shown) through heat exchange with the inverter housing 310.

In an embodiment not shown, the inverter housing 310 may be connected to the main housing 100 so that a fluid can flow therealong. In the above embodiment, the inverter element (not shown) may be directly cooled by the refrigerant introduced into the main housing 100.

The rear side of the inverter housing 310 may be coupled to the inverter cover 320. A separate coupling member (not shown) may be provided for coupling with the inverter cover 320.

An inner space formed by coupling the inverter housing 310 and the inverter cover 320 may be defined as an inverter chamber S1 in which a printed circuit board (not shown) and an inverter element (not shown) can be accommodated.

The connector portion 330 to which power and control signal are applied from outside may be located on an upper side of the inverter housing 310.

Figure 12:
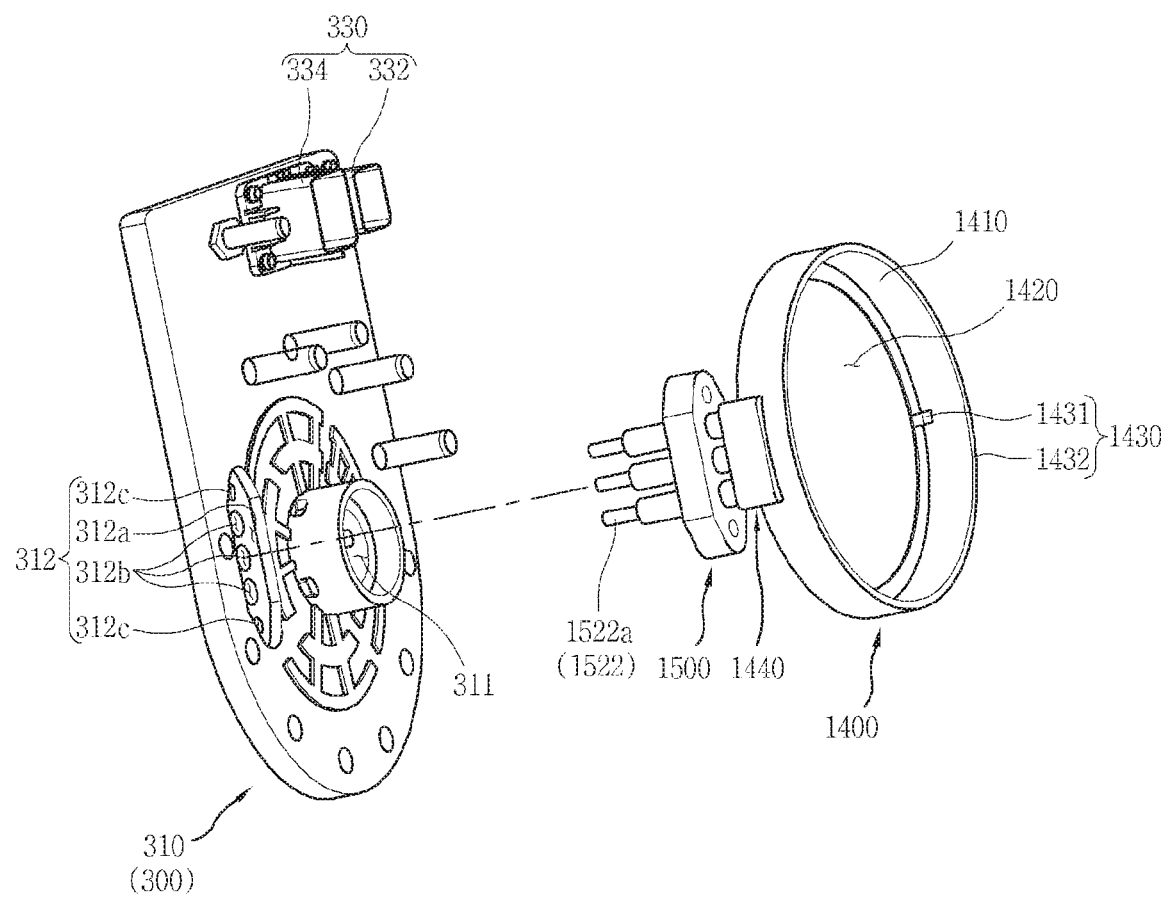
FIG. 12 is an exploded perspective view illustrating a coupling relationship of an inverter part, an electric connection unit, and an insulating housing in accordance with an embodiment of the present disclosure.

Referring to FIG. 12, the inverter housing 310 may comprise a rotational shaft supporting portion 311, a connector coupling portion 312, and a coupling hole 312c.

The rotational shaft supporting portion 311 may be formed on one side surface of the inverter housing 310 facing the main housing 100.

The rotational shaft supporting portion 311 may be formed so that the rotational shaft 1210 of the rotor 1200 of the motor part 1000 can be rotatably inserted therein. Specifically, one end portion of the rotational shaft 1210 which faces the inverter part 300 may be rotatably inserted into the rotational shaft supporting portion 311.

As will be described later, when a current flow along the stator 1100 (the stator 1100 is electrically connected) as power and control signal are applied by the inverter part 300, an electromagnetic field may be formed by a plurality of coils 1150 provided on the stator 1100. A magnet provided in the rotor 1200 may be rotated by receiving an electromagnetic force by the electromagnetic field.

At this time, one end portion of the rotational shaft 1210 may be rotatably inserted into the rotational shaft supporting portion 311 to support the rotor 1200, so that the rotor 1200 can be stably rotated.

In the illustrated embodiment, the rotational shaft supporting portion 311 may be formed as a groove having a circular cross-section.

In addition, a central axis of the rotational shaft supporting portion 311 may be formed coaxially with the stator 1100, the rotor 1200, an insulating unit 1300, and an insulating housing 1400 of the motor part 1000 to be described later. Accordingly, the rotor 1200 may be stably rotated.

The connector coupling portion 312 may comprise a space into which a connector unit 1520 of the electric connection unit 1500 to be described later can be inserted. The connector coupling portion 312 may comprise a support member insertion groove 312a and an electric member insertion opening 312b.

A support member 1521 of the connector unit 1520 may be inserted into the support member insertion groove 312a. The support member insertion groove 312a may be recessed by a predetermined distance into one side surface of the inverter housing 310 facing the main housing 100.

The recessed distance of the support member insertion groove 312a may be determined according to a shape of the support member 1521 of the connector unit 1520.

In one embodiment, the support member insertion groove 312a may be configured such that the support member 1521 is fully accommodated. That is, one side surface of the support member 1521 facing the main housing 100 and one side surface of the inverter housing 310 facing the main housing 100 may be flush with each other.

Further, a cross-sectional shape of the support member insertion groove 312a may be determined to correspond to the shape of the support member 1521.

The electric member insertion opening 312b may comprise a space into which an electric member 1522 and an insulating member 1523 of the connector unit 1520 of the electric connection unit 1500 to be described later can be inserted. Specifically, one end portion of the electric member 1522, namely, an inverter connection end portion 1522a which faces the inverter part 300, and the insulating member 1523 adjacent to the inverter connection end portion 1522*a* may be inserted into the electric member insertion opening 312*b*.

The electric member insertion opening 312*b* may be formed through one side surface of the inverter housing 310 facing the main housing 100. The inverter connection end portion 1522*a* of the electric member 1522 inserted into the electric member insertion opening 312*b* may be electrically connected to the inverter device (not shown) accommodated in the inverter chamber S1.

The number and shape of the electric member insertion opening 312*b* may be determined to correspond to the number and shape of the electric member 1522. In the illustrated embodiment, the electric member insertion holes 312*b* may be formed as through-holes, each having a circular cross-section.

In addition, a total of three electric member insertion holes 312*b* may be formed through the connector coupling portion 312 and spaced apart from one another by predetermined intervals in an up and down direction of the inverter housing 310.

In addition, a diameter of the electric member insertion opening 312*b* may be equal to or larger than a diameter of the insulating member 1523 of the connector unit 1520. In some embodiments, the diameter of the electric member insertion opening 312*b* may be the same as an outer diameter of the insulating member 1523.

Accordingly, after the electric member 1522 and the insulating member 1523 are inserted into the electric member insertion opening 312*b*, an unexpected separation can be prevented.

When the connector unit 1520 is coupled to the inverter housing 310, the support member 1521 may be accommodated in the support member insertion groove 312*a* and the electric member 1522 may be inserted into the electric member insertion opening 312*b*.

This may ensure stable coupling between the connector unit 1520 and the inverter housing 310, thereby stably maintaining the electric connection between the inverter part 300 and the motor part 1000.

A coupling member (not shown) for coupling the inverter housing 310 and the connector unit 1520 may be inserted through the coupling hole 312*c*. The coupling member (not shown) may be a member, such as a screw or rivet, by which at least two members are coupled.

When the connector unit 1520 is coupled to the inverter housing 310, the coupling member (not shown) may be inserted and coupled through a coupling opening 1521*a* of the support member 1521 of the connector unit 1520 and the coupling hole 312*c*.

A position and number of the coupling hole 312*c* may be determined to correspond to a position and number of the coupling opening 1521*a*. In the illustrated embodiment, the coupling hole 312*c* may be formed in the support member insertion groove 312*a*, and may be formed above and below the electric member insertion opening 312*b*.

The inverter cover 320 may define an appearance of the inverter part 300 together with the inverter housing 310. The inverter cover 320 may be located on one side of the inverter housing 310 opposite to the main housing 100, namely, on the rear side of the inverter housing 310 in the illustrated embodiment.

The inverter cover 320 may be coupled to the inverter housing 310 to form a predetermined space therebetween. As described above, the predetermined space may be defined as the inverter chamber S1 in which the inverter device (not shown) can be accommodated.

The inverter cover 320 may be coupled to the inverter housing 310 by a separate coupling element (not shown).

The connector portion 330 may comprise a portion to which power and control signal can be input from the outside. Power and control signal applied to the connector portion 330 may be transmitted to the motor part 1000 to generate a rotational force for the electric compressor 10 to compress a refrigerant.

In the illustrated embodiment, the connector portion 330 may be located on a front upper side of the inverter housing 310. The connector portion 330 may be provided at an arbitrary position where it can receive power and control signal from outside.

The connector portion 330 may comprise a communication connector 332 for receiving a control signal applied and a power connector 334 for receiving power applied. Alternatively, the connector portion 330 may be provided with a single connector to which both power and control signal can be applied.

A process of controlling the motor part 1000 by applying power and control signal to the inverter element (not shown) accommodated in the inverter chamber S1 through the connector portion 330 is well known, so detailed description thereof will be omitted.

The compression part 400 may be rotated in response to the rotation of the motor part 1000 so as to substantially compress a refrigerant.

The compression part 400 may be rotatably connected to the motor part 1000 by the rotational shaft 1210 of the rotor 1200. That is, the compression part 400, the rotor 1200, and the rotational shaft 1210 may be integrally rotated.

The compression part 400 may comprise an orbiting scroll 410 and a fixed scroll 420.

The orbiting scroll 410 may be rotated by the rotation of the motor part 1000. When the motor part 1000 is rotated, an eccentric portion 1220 of the rotor 1200 may be rotated to have a central axis different from the rotational shaft 1210 and a central axis of the motor part 1000. That is, the eccentric portion 1220 may be eccentrically rotated with respect to the central axis of the motor part 1000.

Accordingly, the orbiting scroll 410 rotatably coupled to the eccentric portion 1220 may be eccentrically rotated with respect to the rotational shaft 1210 of the motor part 1000. On the other hand, as will be described later, the fixed scroll 420 may be disposed to have the same central axis as the motor part 1000.

Thus, the orbiting scroll 410 may be rotated relative to the fixed scroll 420 but may be eccentrically rotated. Accordingly, a refrigerant may be compressed in a space between an orbiting wrap 414 of the orbiting scroll 410 and a fixed wrap 424 of the fixed scroll 420.

The orbiting scroll 410 may be accommodated in the main housing 100. In detail, the orbiting scroll 410 may be located at one side of the motor part 1000, namely, at the front side in the illustrated embodiment, in the inner space of the main housing 100.

The orbiting scroll 410 may comprise an orbiting end plate portion 412, an orbiting wrap 414, and a rotational shaft coupling portion 416.

The orbiting end plate portion 412 may form one side of the orbiting scroll 410. In the illustrated embodiment, the orbiting end plate portion 412 may form the rear side of the orbiting scroll 410.

One side surface of the orbiting end plate portion 412, namely, the front surface in the illustrated embodiment, may be brought into contact with a rear surface of a fixed wrap 424 of the fixed scroll 420.

The orbiting wrap 414 may be engaged with the fixed wrap 424 of the fixed scroll 420 to form a predetermined space. The orbiting wrap 414 may be eccentrically rotated with respect to the rotational shaft 1210 in engagement with the fixed wrap 424. Accordingly, a refrigerant may be compressed in the space between the orbiting wrap 414 and the fixed wrap 424.

The orbiting wrap 414 may protrude from the orbiting end plate portion 412. In the illustrated embodiment, the orbiting wrap 414 may protrude from the front surface of the orbiting end plate portion 412.

In the illustrated embodiment, the orbiting wrap 414 may be formed in a spiral shape, but may be formed in any shape that can be engaged with the fixed wrap 424 so that the orbiting wrap 414 can eccentrically rotate relative to the fixed wrap 424.

The rotational shaft coupling portion 416 may be a portion to which the rotational shaft 1210 is coupled. Specifically, the rotational shaft 1210 and the eccentric portion 1220 may be coupled through the rotational shaft coupling portion 416.

The rotational shaft coupling portion 416 may be formed through the orbiting end plate portion 412. In the illustrated embodiment, the rotational shaft coupling portion 416 may be formed through the orbiting scroll 410 in a back and forth direction of the orbiting scroll 410.

A radius of the rotational shaft coupling portion 416 may be determined to be equal to or slightly larger than an outer diameter of the eccentric portion 1220, so that the eccentric portion 1220 can be inserted into the rotational shaft coupling portion 416.

The fixed scroll 420 may not be rotated regardless of the rotation of the motor part 1000. Therefore, when the motor part 1000 is rotated, the orbiting scroll 410 may be eccentrically rotated relative to the fixed scroll 420.

The fixed scroll 420 may be accommodated in the main housing 100. Specifically, the fixed scroll 420 may be located at one side of the orbiting scroll 410 adjacent to the rear housing 200, namely, at the front side in the illustrated embodiment.

In an embodiment not shown, the fixed scroll 420 may not be accommodated in the main housing 100, but may be located between the main housing 100 and the rear housing 200. In the embodiment, the fixed scroll 420 may be exposed to outside of the electric compressor 10.

One side surface of the fixed scroll 420, namely, the front surface in the illustrated embodiment, may be coupled to the rear housing 200 to form a predetermined space together with the rear housing 200. The space formed between the fixed scroll 420 and the rear housing 200 may be defined as a discharge chamber S3 through which a refrigerant passes before entering the exhaust passage 210.

The fixed scroll 420 may be rotatably coupled with the orbiting scroll 410. As described above, the fixed scroll 420 may be fixed and the orbiting scroll 410 may be rotated relative to the fixed scroll 420.

The fixed scroll 420 may comprise a fixed end plate portion 422, a fixed wrap 424, a discharge valve 426, and a discharge port 428.

In addition, a rotational shaft coupling portion (not shown) may be formed in the fixed scroll 420 so that the rotational shaft 1210 can be rotatably coupled.

However, as described above, the fixed scroll 420 may not be rotated regardless of the rotation of the motor part 1000. Therefore, the rotational shaft coupling portion (not shown) of the fixed scroll 420 may be said to support the rotational shaft 1210.

The fixed end plate portion 422 may form one side of the fixed scroll 420. In the illustrated embodiment, the fixed end plate portion 422 may form the front side of the fixed scroll 420.

One side surface of the fixed end plate portion 422, namely, the rear surface in the illustrated embodiment, may be brought into contact with the front surface of the orbiting wrap 414 of the orbiting scroll 410.

In the illustrated embodiment, a plurality of grooves may be formed in an outer circumferential surface of the fixed end plate portion 422. This is to reduce a weight of the electric compressor 10, and a shape and number of the groove may change.

The fixed wrap 424 may be engaged with the orbiting wrap 414 of the orbiting scroll 410 to form a predetermined space. After the fixed wrap 424 is engaged with the orbiting wrap 414, when the orbiting scroll 410 is rotated in response to the rotation of the motor part 1000, the refrigerant may be compressed in the space between the fixed wrap 424 and the orbiting wrap 414.

The fixed wrap 424 may protrude from the fixed end plate portion 422. In the illustrated embodiment, the fixed wrap 424 may protrude rearward from the fixing end plate portion 422.

In the illustrated embodiment, the fixed wrap 424 may be formed in a spiral shape, but may be formed in any shape that can be engaged with the orbiting wrap 414 so that the orbiting wrap 414 can eccentrically rotate relative to the fixed wrap 424.

The discharge valve 426 may be configured to open or close the discharge port 428, which may be a passage through which the refrigerant compressed by the relative rotation of the orbiting scroll 410 and the fixed scroll 420 flows into the discharge chamber S3.

In one embodiment, the discharge valve 426 may be provided as a check valve, such as a reed valve, which may constrain (limit) a flow of a fluid to a single direction according to pressure.

The discharge valve 426 may be located on one side of the fixed end plate portion 422 opposite to the fixed wrap 424, namely, on the front side of the fixed end plate portion 422 in the illustrated embodiment. In addition, the discharge valve 426 may be disposed to cover the discharge port 428.

When pressure of a compressed refrigerant becomes predetermined pressure or higher, the discharge valve 426 may open the discharge port 428. As a result, the compressed refrigerant may flow into the discharge chamber S3.

When the pressure of the compressed refrigerant is lower than the predetermined pressure, the discharge valve 426 may close the discharge port 428. Accordingly, a refrigerant lacking in pressure may not flow into the discharge chamber S3.

The discharge port 428 may be a passage through which the refrigerant compressed by the orbiting scroll 410 and the fixed scroll 420 flows into the discharge chamber S3. The discharge port 428 may connect the space formed between the orbiting wrap 414 and the fixed wrap 424 to the discharge chamber S3 so that a fluid can flow therealong.

The discharge port 428 may be opened or closed. Specifically, the discharge valve 426 may be provided on the discharge port 428, so as to open or close the discharge port 428 according to pressure of a compressed refrigerant.

The refrigerant discharged through the discharge port 428 may flow out of the electric compressor 10 through the exhaust port 212 sequentially via the discharge chamber S3 and the exhaust passage 210.

In addition to the aforementioned configuration, the electric compressor 10 according to the embodiment may comprise various components for compressing a refrigerant.

In addition, although not shown, the electric compressor 10 may comprise a refrigerant passage in which a refrigerant can be introduced and compressed and then discharged to the outside of the electric compressor 10, and a member for forming the refrigerant passage.

Similarly, although not shown, the electric compressor 10 may comprise an oil passage along which oil can be supplied to the compression part 400, oil compressed together with the refrigerant in the compression part 400 can be discharged from the rear housing 200 through the oil discharge passage 220 to be supplied back into the compression part 400, and a member for forming the oil passage.

The electric compressor 10 according to the embodiment may comprise the motor part 1000 that supplies a rotational force for the compression part 400 to compress a refrigerant. The motor part 1000 may be electrically connected to the inverter part 300 and may be operated according to power and control signal applied from the inverter part 300.

The rotational force generated by the operation of the motor part 1000 may be transmitted to the orbiting scroll 410 of the compression part 400 to form power for compressing a refrigerant.

In addition, the motor part 1000 according to the embodiment may comprise various components for preventing power leakage that may occur in the motor part 1000 as a high voltage is applied, and effectively dissipating (discharging) generated heat.

Hereinafter, the motor part 1000 according to the illustrated embodiment will be described in detail with reference to FIGS. 4 to 13. In the illustrated embodiment, the motor part 1000 may comprise the stator 1100, the rotor 1200, the insulating unit 1300, the insulating housing 1400, and the electric connection unit 1500.

The stator 1100 may form an electromagnetic field according to power and control signal applied from the inverter part 300. By the electromagnetic field formed by the stator 1100, a magnet provided in the rotor 1200 may be rotated by receiving an electromagnetic force.

The stator 1100 may be electrically connected to the inverter part 300. As will be described later, the inverter part 300 may be connected to the electric connection unit 1500, and the electric connection unit 1500 may be electrically connected to the stator 1100 by any member (not shown) such as an electric wire. Accordingly, the power and control signal applied from the inverter part 300 may be transmitted to the stator 1100.

The stator 1100 may have a cylindrical shape extending in a lengthwise direction, namely, to the front and rear sides in the illustrated embodiment. Although the shape of the stator 1100 may change, it may be preferable to decide the shape in consideration that the motor room 110 can be formed in the cylindrical shape.

The stator 1100 may be brought into contact with the motor room 110. Specifically, the stator 1100 may be accommodated to be fixed to an inner circumferential surface of the motor room 110. The stator 1100 may not be rotated even when power and control signal are applied from the inverter part 300.

The rotor 1200 may be located inside the stator 1100. The rotor 1200 may be spaced apart from the stator 1100 by a predetermined distance. That is, the stator 1100 and the rotor 1200 may not be in contact with each other.

The stator 1100 may comprise a yoke 1110, an outer circumferential portion 1120, a tooth 1130, a coil winding space 1140, a coil 1150, a rotor accommodating portion 1160, an insulating protrusion 1170, and a stator coupling portion 1180.

The yoke 1110 may be provided in plural as a plate-shaped member. The stator 1100 may be formed by stacking the plurality of yokes 1110. A length of the stator 1100, that is, the length of the stator 1100 in the back and forth direction may vary depending on the number of yokes 1110 stacked.

In one embodiment, the yoke 1110 may be formed of a conductive electric steel sheet. A plurality of coils 1150 may be wound around the yokes 1110 to exert an electromagnetic force on the magnet of the rotor 1200.

Figure 8:
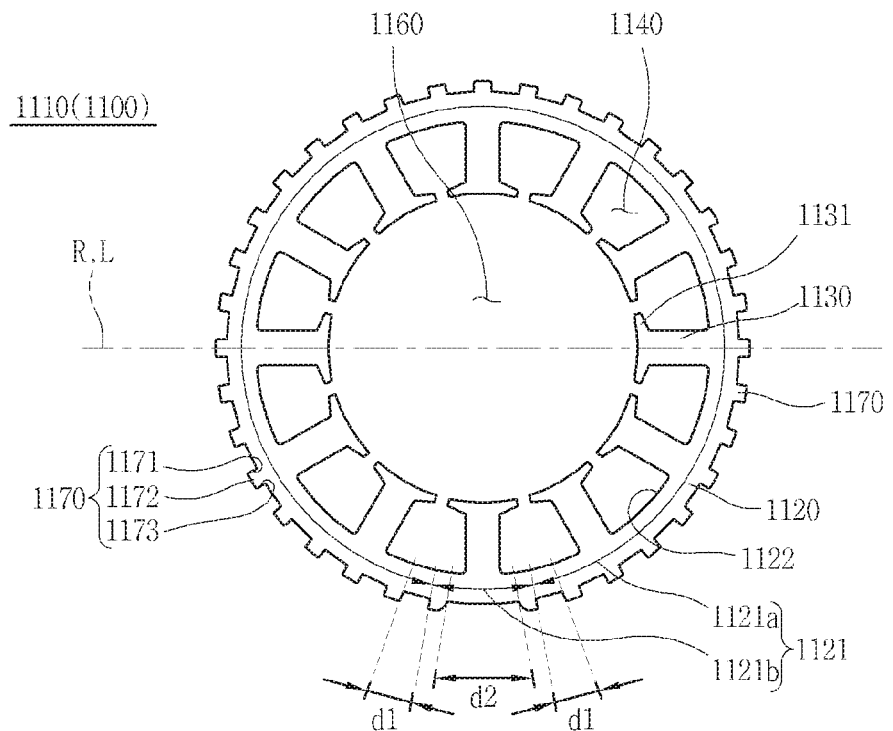
FIG. 8 is a planar view of the stator provided in the motor part of FIG. 4 in accordance with an embodiment of the present disclosure.
Figure 9:
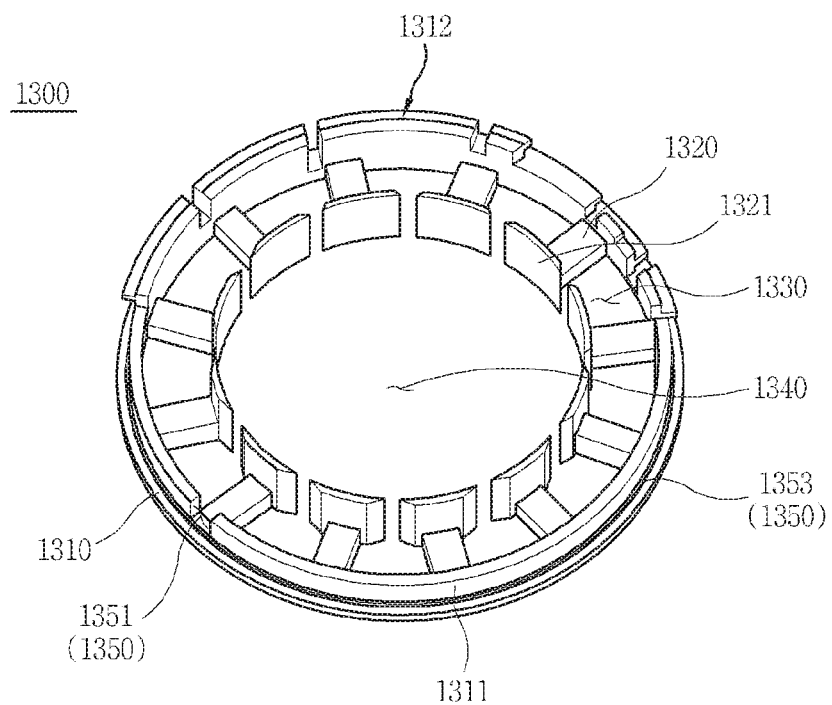
FIG. 9 is a perspective view of the insulating unit provided in the motor part of FIG. 4 in accordance with an embodiment of the present disclosure.

Referring to FIG. 8, a cross-section of the stator 1100 is shown. Since the stator 1100 may be formed by stacking the plurality of yokes 1110, the stator 1100 may have the same cross-section as the yoke 1110.

The following description will be given with reference to the stator 1100 in which the plurality of yokes 1110 may be stacked.

The outer circumferential portion 1120 may define an outer circumference of the stator 1100. In the illustrated embodiment, the stator 1100 may have a circular cross-section, and thus the outer circumferential portion 1120 may be used to denote an area including an outer circumferential surface 1121, an inner circumferential surface 1122, and a space between the outer circumferential surface 1121 and the inner circumferential surface 1122.

The outer circumferential portion 1120 may comprise the outer circumferential surface 1121 and the inner circumferential surface 1122.

The outer circumferential surface 1121 may define an outer surface of the stator 1100. In the illustrated embodiment, the stator 1100 may be cylindrical, and thus the outer circumferential surface 1121 may be defined as a side surface of the stator 1100.

A plurality of insulating protrusions 1170 may protrude from the outer circumferential surface 1121.

The insulating protrusions 1170 may be spaced apart from one another by predetermined distances and continuously disposed along the outer circumferential surface 1121. In other words, a portion where the insulating protrusion 1170 is formed and a portion where the insulating protrusion 1170 is not formed may be alternately repeated on the outer circumferential surface 1121.

As the insulating protrusions 1170 are provided on the outer circumferential surface 1121, a surface area of the outer circumferential surface 1121 can be increased so as to improve an insulation effect.

The outer circumferential surface 1121 may comprise a first region 1121a and a second region 1121b.

The first region 1121a may be a region in which the plurality of insulating protrusions 1170 is spaced apart from one another by the same distance. In the illustrated embodiment, the first region 1121a may be formed in an upper semicircle and a part of a lower semicircle of the outer circumferential surface 1121.

The second region 1121b may be a portion in which the plurality of insulating protrusions 1170 is spaced apart from each other by a different distance. In the illustrated embodiment, the second region 1121b may be formed in a part of the lower semicircle of the outer circumferential surface 1121.

The number and position of the first region 1121a and the second region 1121b may change. However, the first region 1121a and the second region 1121b may be formed in any manner if they are asymmetric with respect to an arbitrary straight line passing through a central axis of the stator 1100 on the cross-section of the stator 1100.

As the first region 1121*a* and the second region 1121*b* are asymmetrically partitioned on the outer circumferential surface 1121, the stator 1100 may be coupled to the motor room 110 along a specific direction. Detailed description of this will be given later.

The inner circumferential surface 1122 may define an inner surface of the outer circumferential portion 1120. The plurality of teeth 1130 may protrude from the inner circumferential surface 1122 toward the center of the stator 1100.

Spaces between the inner circumferential surface 1122 and the plurality of teeth 1130 may be defined as coil winding spaces 1140. A coil 1150 may be wound around each coil winding space 1140.

The coil 1150 may be wound around the tooth 1130. The tooth 1130 may be provided in plurality. The plurality of teeth 1130 may protrude from the inner circumferential surface 1122 toward the center of the stator 1100. That is, the plurality of teeth 1130 may protrude radially inward from the inner circumferential surface 1122.

The plurality of teeth 1130 may protrude by the same distance. This may be to allow the rotor accommodating portion 1160 defined by ends of the plurality of teeth 1130 to have a circular shape.

The plurality of teeth 1130 may be spaced apart from one another by predetermined distances. Accordingly, one of the plurality of teeth 1130 and another tooth 1130 adjacent to the one tooth may form a predetermined space. The coil winding space 1140 may be defined by the space.

Currents of different phases may be applied to the coils 1150 wound around the teeth 1130 adjacent to each other. In one embodiment, a current having one of three phases may be applied to each coil 1150.

At least one of the plurality of teeth 1130 may be provided with a coupling groove 1182 to be described later. A first coupling groove 1182*a* and a second coupling groove 1182*b* may be formed in a first tooth 1130*a* and a second tooth 1130*b* different from the first tooth 1130*a*, respectively. The first coupling groove 1182*a* and the second coupling groove 1182*b* may be formed in different numbers.

Accordingly, the stator 1100 and the insulating unit 1300 may be coupled to each other in a specific direction. Detailed description of this will be given later.

A pole shoe 1131 may be formed on one end portion of each of the plurality of teeth 1130 facing a central axis of the stator 1100. The pole shoe 1131 may prevent the coil 1150 wound around each tooth 1130 from being pushed (leaned).

The pole shoe 1131 may form a predetermined angle with the tooth 1130. In one embodiment, the pole shoe 1131 may be perpendicular to the tooth 1130.

The coil winding space 1140 may be a space that can be occupied by the coil 1150 wound on the tooth 1130. As winding of the coil 1150 proceeds, a thickness of the wounded coil 1150 in a circumferential direction of the wound coil 1150 may increase.

The coil winding space 1140 may be defined as a space in which the coil 1150 can be accommodated. The coil winding space 1140 may be defined by the space which may be formed by neighboring teeth 1130 spaced apart from each other.

As described above, the plurality of teeth 1130 may be spaced apart from one another in the circumferential direction of the stator 1100, and thus the coil winding space 1140 may also be formed in plurality.

The coil 1150 may be configured so that a current corresponding to power applied to the stator 1100 can flow therealong. The coil 1150 may be provided in plurality. The plurality of coils 1150 may be wound around the plurality of teeth 1130, respectively.

In addition, as will be described later, in an embodiment in which the coil 1150 is wound after the insulating unit 1300 is coupled to the stator 1100, the coil 1150 may be wound around both the tooth 1150 and an insulation tooth 1320. In this case, the tooth 1130 and the insulation tooth 1320 may be disposed to overlap each other.

A phase of a current flowing on each coil 1150 may be configured differently. In one embodiment, a current having one of U phase, V phase, and W phase may flow on each coil 1150.

Currents of a U phase, a V phase, and a W phase may flow on three adjacent coils 1150, respectively. In addition, the phases of the currents may flow on the respective coils 1150 wound on the teeth 1130, in the order of the U phase, the V phase, and the W phase along the circumferential direction of the stator 1100.

When a current is applied to each coil 1150, an electromagnetic field may be formed accordingly. The magnet provided in the rotor 1200 may be rotated by receiving an electromagnetic force by the electromagnetic field.

The rotor 1200 may be accommodated in the rotor accommodating portion 1160. The rotor accommodating portion 1160 may be in a hollow shape formed in the lengthwise direction of the stator 1100.

An outer circumference of the rotor accommodating portion 1160 may be defined by the pole shoes 1131. In addition, a radius of the rotor accommodating portion 1160 may be defined by a protruded distance of the tooth 1130.

The rotor 1200 accommodated in the rotor accommodating portion 1160 may not be in contact with the stator 1100. That is, the rotor 1200 may be located spaced apart from the stator 1100, in detail, from the pole shoe 1131 by a predetermined distance, within the rotor accommodating portion 1160. Accordingly, the rotor 1200 can be rotated relative to the stator 1100.

An insulating protrusion 1170 may protrude outward from the outer circumferential surface 1121 in a radial direction of the stator 1100. The insulating protrusion 1170 may be configured to increase a surface area of the outer circumferential surface 1121. In addition, the insulating protrusion 1170 may form a flow path through which a refrigerant flows along the outer circumferential surface 1121 of the stator 1100.

The insulating protrusion 1170 may be provided in plurality. The plurality of insulating protrusions 1170 may be spaced apart from one another by predetermined distances. The plurality of insulating protrusions 1170 may be continuously arranged with being spaced apart from one another by the predetermined distances along the outer circumferential surface 1121.

The insulating protrusion 1170 may extend in the lengthwise direction of the stator 1100, namely, in the back and forth direction in the illustrated embodiment. Predetermined spaces defined as the plurality of insulating protrusions 1170 may be spaced apart from one another may also extend in the lengthwise direction of the stator 1100.

The predetermined space may function as a flow path through which a refrigerant flows. Accordingly, the flow of the refrigerant can further be activated, and an area of the outer circumferential surface 1121 in contact with the refrigerant can be increased, so as to improve an insulation effect of the stator 1100.

Furthermore, the insulating protrusion 1170 may be provided in plurality spaced apart from one another by the predetermined distances along the outer circumferential surface 1121. Accordingly, the space may be defined in plurality by neighboring insulating protrusions 1170 along the outer circumferential surface 1121. In each of the spaces, the refrigerant may flow toward the compression part 400.

As a result, the refrigerant can flow at each position of the outer circumferential surface 1121, and the stator 1100 can be uniformly insulated accordingly.

In the first region 1121*a* of the outer circumferential surface 1121, the plurality of insulating protrusions 1170 may be spaced apart from each other by the same distance. On the other hand, in the second region 1121*b* of the outer circumferential surface 1121, the plurality of insulating protrusions 1170 may be spaced apart from one another by different distances.

Specifically, a coupling space 1181 to be described later may be formed in the second region 1121*b*, so as to allow proper coupling between the stator 1100 and the motor room 110.

Referring to an exemplary reference line RL illustrated in FIG. 8, the first region 1121*a* may be formed in a semicircle located at an upper side of the reference line RL and a part of a semicircle located a lower side of the reference line RL. In addition, the second region 1121*b* may be formed in the remaining part of the semicircle located at the lower side of the reference line RL.

That is, the first region 1121*a* and the second region 1121*b* may be formed asymmetrically with respect to the reference line RL. Accordingly, when the stator 1100 is accommodated in the motor room 110, the second region 1121*b* may be located at a lower side. This can prevent the stator 1100 and the motor room 110 from being coupled in a wrong direction.

In the illustrated embodiment, the insulating protrusion 1170 may comprise a first surface 1171, a second surface 1172, and a third surface 1171.

The first surface 1171 may extend while forming a predetermined angle with the outer circumferential surface 1121. In one embodiment, the first surface 1171 may extend in parallel with a diameter of a cross-section of the stator 1100.

The second surface 1172 may extend while forming a predetermined angle with the first surface 1171. In one embodiment, the second surface 1172 may extend to form a circumferential surface concentric with the outer circumferential surface 1121.

The third surface 1173 may extend toward the outer circumferential surface 1121 while forming a predetermined angle with the second surface 1172. In one embodiment, the third surface 1173 may extend in parallel with the diameter of the cross-section of the stator 1100.

By the first surface 1171, the second surface 1172, and the third surface 1175 described above, the insulating protrusion 1170 in the illustrated embodiment may be formed in a shape of a tooth having a rectangular cross-section.

The shape of the insulating protrusion 1170 is not limited thereto, and may have any shape capable of increasing a surface area of the outer circumferential surface 1121. For example, the insulating protrusion 1170 may be formed in a random shape having a triangular or circular cross-section or at least one curve.

The stator coupling portion 1180 may be a portion in which the stator 1100 is coupled to the motor room 110 and an insulating unit 1300 to be described later. That is, the stator 1100 may be easily and stably coupled with the motor room 110 and the insulating unit 1300 by the stator coupling portion 1180.

The stator coupling portion 1180 may comprise a coupling space 1181 and a coupling groove 1182.

The coupling space 1181 may allow the stator 1100 to be coupled to the motor room 110 of the main housing 100 in a specific direction. By the coupling space 1181, the stator 1100 may be accommodated in the motor room 110 only in a direction in which the coupling protrusion 111 of the motor room 110 can be inserted into the coupling space 1118.

The coupling space 1181 may be located on the outer circumferential surface 1121. In detail, the coupling space 1181 may be located on the second region 1121*b* where the plurality of insulating protrusions 1170 is spaced apart from each other by a different distance.

The coupling space 1181 may be formed as the adjacent insulating protrusions 1170 are spaced apart from each other by a distance d2, which is different from a spaced distance d1 between the remaining insulating protrusions 1170 adjacent to one another.

A coupling protrusion 111 formed on the inner circumferential surface of the motor room 110 may be inserted into the coupling space 1181. A size and shape of the coupling space 1181 may be determined to correspond to a size and shape of the coupling protrusion 111.

In one embodiment, the distance d2 between the adjacent insulating protrusions 1170 defining the coupling space 1181 may be greater than the distance d1 between the other insulating protrusions 1170 adjacent to one another.

When the distance d2 between the adjacent insulating protrusions 1170 defining the coupling space 1181 is smaller than the distance d1 between the adjacent insulating protrusions 1170 which do not define the coupling space 1181, the size of the coupling protrusion 111 may also be correspondingly reduced.

In this case, the coupling protrusion 111 may also be inserted into a space formed between the adjacent insulating protrusions 1170 which do not define the coupling space 1181. This is because the stator 1100 may not be guaranteed to be always accommodated in the motor room 110 in the same direction.

In the illustrated embodiment, the coupling space 1181 may be formed by one in number on the lower side of the outer circumferential surface 1121. Alternatively, the coupling space 1181 may be formed in plurality at arbitrary positions on the outer circumferential surface 1121. In either case, it may be sufficient if the coupling space 1181 is formed asymmetrically with respect to an arbitrary straight line passing through the center of the cross-section of the stator 1100.

The coupling groove 1182 may allow the stator 1100 to be coupled to the insulating portion 1300 in a specific direction. By the coupling groove 1182, the stator 1100 and the insulating unit 1300 can be coupled only in a direction in which a coupling protrusion 1352 of the insulating unit 1300 can be inserted into the coupling groove 1182.

The coupling groove 1182 may be formed in the plurality of teeth 1130. In detail, each coupling groove 1182 may be recessed by a predetermined distance into one side surface of the corresponding tooth 1130 facing the insulating unit 1300.

The number, position, shape, and recessed distance of the coupling groove 1182 may be preferably determined to correspond to the number, position, shape, and protruded distance of the coupling protrusion 1352.

The coupling groove 1182 may be provided in plurality. In addition, the coupling grooves 1182 may be formed at different positions from one another.

In the illustrated embodiment, the coupling groove 1182 may be provided with one first coupling groove 1182a in the first tooth 1130a and two second coupling grooves 1182b in the second tooth 1130b.

The coupling groove 1182, similar to the aforementioned coupling space 1181, may be formed asymmetrically with respect to an arbitrary straight line passing through the center of the cross-section of the stator 1100.

That is, the position or number of the coupling groove 1182 formed in one of the teeth 1130 may be different from the position or number of the coupling groove 1182 formed in another tooth 1130.

Accordingly, the stator 1100 and the insulating unit 1300 can be coupled only in a specific direction, thereby preventing the stator 1100 and the insulating unit 1300 from being incorrectly assembled depending on directions.

The motor room 110, the stator 1100, the insulating unit 1300, and an insulating housing 1400 to be described later may all be circular in cross-section, and thus may not be easily coupled in a desired direction.

The stator coupling portion 1180 can constrain coupling between the stator 1100 and the motor room 110 and between the stator 1100 and the insulating unit 1300 to be performed in a specific direction, thereby preventing misassembly.

In addition, coupling between the insulating unit 1300 and the insulating housing 1400 may be constrained by an insulation coupling portion 1350 and a housing coupling portion 1430, which will be described later.

(2) Description of the Rotor 1200

The rotor 1200 may generate a rotational force for the compression part 400 to compress a refrigerant.

The rotor 1200 may be rotatably received in the rotor accommodating portion 1160 of the stator 1100. The rotor 1200 may be spaced apart from the stator 1100 by a predetermined distance to avoid a contact with the stator 1100.

The rotor 1200 may comprise a plurality of magnets (not shown). When power and control signal are applied to the stator 1100 from the inverter part 300, the plurality of coils 1150 may form an electromagnetic field.

The plurality of magnets (not shown) may receive an electromagnetic force by the electromagnetic field, and the rotor 1200 can be rotated accordingly.

The rotor 1200 may comprise the rotational shaft 1210 and the eccentric portion 1220.

The rotational shaft 1210 may be rotated integrally with the rotor 1200. The rotational shaft 1210 may be connected to the orbiting scroll 410, and the orbiting scroll 410 may be rotated integrally with the rotational shaft 1210. That is, the rotor 1200, the rotational shaft 1210, and the orbiting scroll 410 may be rotated in an integral manner.

One end portion of the rotational shaft 1210 facing the inverter part 300 may be rotatably accommodated in the rotational shaft supporting portion 311 of the inverter part 300. Even if the rotational shaft 1210 is rotated, the inverter part 300 may not be rotated. That is, the rotational shaft 1210 may be supported by the rotational shaft supporting portion 311.

The eccentric portion 1220 may be provided on one side of the rotational shaft 1210 facing the orbiting scroll 410.

The eccentric portion 1220 may be configured such that the orbiting scroll 410 is eccentrically rotated relative to the fixed scroll 420. The eccentric portion 1220 may be rotated integrally with the rotational shaft 1210, but may have a different central axis.

The eccentric portion 1220 may be coupled to the orbiting scroll 410. Accordingly, the orbiting scroll 410 may be rotated to have a central axis different from the rotational shaft 1210 of the rotor 1200.

The process of compressing a refrigerant by the orbiting scroll 410 and the fixed scroll 420 through such procedures is a well-known technique, so a detailed description thereof will be omitted.

(3) Description of the Insulating Unit 1300

The insulating unit 1300 may be configured to insulate heat or current generated, in response to rotation of the rotor 1200 caused by an electromagnetic field, which may be formed in the stator 1100 by power and control signal applied from the inverter part 300.

The insulating unit 1300 may be coupled to each of end portions of the stator 1100 in the lengthwise direction of the stator 1100, namely, the front and rear end portions in the illustrated embodiment. The insulating unit 1300 may insulate heat and current generated as power and control signal are applied to the stator 1100.

The insulating unit 1300 may be formed of an insulating material. That is, the insulating unit 1300 may be formed of a material which has low thermal conductivity and is nonconductive. In one embodiment, the insulating unit 1300 may be formed of synthetic resin or the like.

In the illustrated embodiment, the insulating unit 1300 may have a circular cross-section. The insulating unit 1300 may be formed in any shape that can cover the both end portions of the stator 1100 in the lengthwise direction of the stator 1100.

One side surface of the insulating unit 1300 facing the stator 1100 may be in contact with the stator 1100. In addition, an insulating housing 1400 to be described later may be coupled to another side surface of the insulating unit 1300 opposite to the stator 1100.

An outer circumferential surface of the insulating unit 1300 may be formed to fit with the outer circumferential surface 1121 of the stator 1100. This is because, if a diameter of the insulating unit 1300 is too large, smooth assembly may be difficult due to the coupling protrusion 111 when the insulating unit 1300 is accommodated in the motor room 110.

A cross-section of the insulating unit 1300 may be formed in the same shape as the cross-section of the stator 1100. This is to make the insulating unit 1300 completely cover the stator 1100 when the insulating unit 1300 and the stator 1100 are coupled to each other.

The insulating unit 1300 may comprise a first insulating portion 1300a and a second insulating portion 1300b. The first insulation portion 1300a may be coupled to one end portion of the stator 1100 facing the inverter part 300. In addition, the second insulating portion 1300b may be coupled to another end portion of the stator 1100, which is opposite to the first insulating portion 1300a, namely, faces the rear housing 200.

The first insulating portion 1300a and the second insulating portion 1300b may have the same structure and function except for that only the first insulating portion 1300a may be provided with a housing slot 1312 to be described below. Hereinafter, the first insulating portion 1300a and the second insulating portion 1300b will be described as the insulating unit 1300.

The insulating unit 1300 may comprise an insulation outer circumferential portion 1310, an insulation tooth 1320, a coil accommodating portion 1330, an insulation opening 1340, and an insulation coupling portion 1350.

The insulation outer circumferential portion 1310 may define an outer circumference of the insulating unit 1300. In the illustrated embodiment, the insulating unit 1300 may be formed in a ring shape in which the insulation outer circumferential portion 1310 is an outer surface (edge).

The insulation outer circumferential portion 1310 may be provided with a stepped portion 1311 and a housing slot 1312.

The stepped portion 1311 may protrude from the insulation outer circumferential portion 1310 toward the insulating housing 1400.

The stepped portion 1311 may be brought into contact with an inner circumferential surface 1412 of the insulating housing 1400 when the insulating unit 1300 is coupled to the insulating housing 1400. As a result, when the coupling of the motor part 1000 is completed, the insulating unit 1300 may not be randomly separated from the insulating housing 1400.

In addition, the stepped portion 1311 may surround the plurality of coils 1150 wound around the teeth 1130 from outside in a radial direction. Accordingly, heat or current flowing to outside of the stator 1100 in the radial direction can be insulated.

The stepped portion 1311 may protrude from the insulation outer circumferential portion 1310 by different distances (lengths). In the illustrated embodiment, the stepped portion 1311 may protrude more from an upper part of the insulation outer circumferential portion 1310 than from the other part of the insulation outer circumferential portion 1310.

In addition, the stepped portion 1311 may form a predetermined space. That is, the stepped portion 1311 may not be continuously formed along the insulation outer circumferential portion 1310, but may be provided in plurality spaced apart from one another by predetermined distances.

A coupling slot 1351 of the insulation coupling portion 1350 to be described later may be formed on the stepped portion 1311.

The housing slot 1312 may be a portion to which a terminal accommodating portion 1440 of the insulating housing 1400 is coupled. The terminal accommodating portion 1440 of the insulating housing 1400 may be formed in a shape protruding radially to the inside of the insulating housing 1400 formed in the ring shape.

The housing slot 1312 may comprise spaces and protrusions which may be formed to correspond to the shape of the terminal accommodating portion 1440. When the insulating unit 1300 and the insulating housing 1400 are coupled to each other, the terminal accommodating portion 1440 may be coupled with the housing slot 1312. This may result in preventing relative rotation between the insulating unit 1300 and the insulating housing 1400.

In the illustrated embodiment, the housing slot 1312 may be formed on the upper side of the insulation outer circumferential portion 1310. In addition, the housing slot 1312 may protrude more than the other stepped portion 1311.

The position and shape of the housing slot 1312 may change to correspond to the position and shape of the terminal accommodating portion 1440 of the insulating housing 1400.

The insulation tooth 1320 may protrude radially inward from an inner circumferential surface of the insulation outer circumferential portion 1310. The insulation tooth 1320 may be provided in plurality. The plurality of insulation teeth 1320 may be spaced apart from one another by predetermined intervals.

The coil 1150 may be wound around the insulation tooth 1320. In this embodiment, the coil 1150 may be wound after the insulating unit 1300 is coupled to the stator 1100. In addition, in the illustrated embodiment, the insulation teeth 1320 may be disposed to overlap the teeth 1130.

As the plurality of insulation teeth 1320 is spaced apart from one another, spaces may be formed between the adjacent insulation teeth 1320. The space may be defined as a coil accommodating portion 1330, which will be described later.

A protruded distance of the insulation tooth 1320 may be determined according to the tooth 1130 of the stator 1100. In one embodiment, the protruded distance of the insulation tooth 1320 may be determined to be equal to the protruded distance of the tooth 1130.

An insulation pole shoe 1321 may be formed on one end portion of the insulation tooth 1320. The insulation pole shoes 1321 may be formed to surround the plurality of coils 1150 wound around the teeth 1130 at an inside in the radial direction. Accordingly, heat or current flowing to inside of the stator 1100 in the radial direction can be insulated.

The insulation pole shoe 1321 may extend in the circumferential direction while forming an angle with the insulation tooth 1320. In one embodiment, the insulation pole shoe 1321 may be formed perpendicular to the insulation tooth 1320.

The insulation pole shoes 1321 may define an outer circumference of the insulation opening 1340.

The coil accommodating portion 1330 may be a space in which one side of each of the plurality of coils 1150 wound around the teeth 1130 and the insulation teeth 1320, that is, one side of each coil 1150 adjacent to the insulating unit 1300 is accommodated. The coil accommodating portion 1330 may be defined by the spaces formed between the adjacent insulation teeth 1320.

As described above, in the embodiment in which the coil 1150 is wound after the insulating unit 1300 is coupled to the stator 1100, the coil 1150 may be wound around both the tooth 1150 and the insulation tooth 1320. In this case, the tooth 1130 and the insulation tooth 1320 may be disposed to overlap each other.

The coil accommodating portion 1330 may form a space together with the coil winding space 1140 of the stator 1100, and the space may be occupied by the coil 1150 wound around the tooth 1130 and the insulation tooth 1320.

The coil accommodating portion 1330 may be aligned with the coil winding space 1140. The coil accommodating portion 1330 may be formed in the same structure as the coil winding space 1140 so as to perform the same function.

The coil accommodating portion 1330 may be defined by the space formed by the neighboring insulation teeth 1320 spaced apart from each other. As described above, the plurality of insulation teeth 1320 may be spaced apart from one another in the circumferential direction of the insulating unit 1300, and thus the coil winding space 1330 may also be formed in plurality.

The insulation opening 1340 may be a space defined inside the insulating unit 1300. The rotor 1200 may be rotatably accommodated in the insulation opening 1340. The rotor 1200 may be accommodated in the insulation opening 1340 in a spaced manner by a predetermined distance. Thus, the rotor 1200 can be rotated relative to the insulating unit 1300.

An outer circumference of the insulation opening 1340 may be defined by the insulation teeth 1320 and the insulation pole shoes 1321.

That is, a diameter of the insulation opening 1340 may be determined according to a protruded distance of the insulation tooth 1320. In addition, a shape of the insulation opening 1340 may be determined according to the shape and arrangement of the insulation pole shoes 1321.

In the illustrated embodiment, the outer circumference of the insulation opening 1340 may be formed in a circular shape, in consideration of the shape of the rotor 1200 which extends in the lengthwise direction. The outer circumference of the insulation opening 1340 may have any size and shape suitable for rotatably accommodating the rotor 1200 therein.

The insulation coupling portion 1350 may be a portion where the insulating unit 1300 is coupled to the stator 1100 and the insulating housing 1400. The insulation coupling portion 1350 can facilitate and stabilize coupling between the insulating unit 1300 and the stator 1100 and between the insulating unit 1300 and the insulating housing 1400.

The insulation coupling portion 1350 may comprise a coupling slot 1351 and a coupling protrusion 1352.

The coupling slot 1351 may be a portion where the insulating unit 1300 is coupled with the insulating housing 1400. The coupling slot 1351 may be formed as the stepped portions 1311 formed on the insulation outer circumferential portion 1310 are spaced apart from each other by a predetermined distance. In other words, the coupling slot 1351 may be a space between the stepped portions 1311 adjacent to each other.

A coupling key 1431 of the insulating housing 1400 may be inserted into the coupling slot 1351. In the illustrated embodiment, the coupling slot 1351 may be formed as a space having an outer circumference of a rectangular pillar. This is because the coupling key 1431 of the insulating housing 1400 may be formed as a protrusion having a rectangular pillar shape.

The coupling slot 1351 may be formed in a shape and size corresponding to the coupling key 1431.

In the illustrated embodiment, the coupling slot 1351 may be provided by one in number on the stepped portion 1311 other than the housing slot 1312. Alternatively, the coupling slot 1351 may be provided in plurality on the stepped portion 1311.

When the insulating unit 1300 and the insulating housing 1400 are coupled to each other, the coupling key 1431 of the insulating housing 1400 may be inserted into the coupling slot 1351. Therefore, the insulating unit 1300 and the insulating housing 1400 may be constrained to be coupled in a specific direction. Furthermore, the coupled insulation unit 1300 and insulation housing 1400 may not rotate relative to each other.

A coupling protrusion 1352 may be a portion where the insulating unit 1300 and the stator 1100 are coupled to each other. The coupling protrusion 1352 may protrude by a predetermined distance from one side surface of the insulating unit 1300 facing the stator 1100.

The coupling protrusion 1352 may be formed on one side surface of the insulation tooth 1320.

The coupling protrusion 1352 may be inserted into the coupling groove 1182 of the stator 1100. As the coupling protrusion 1352 is inserted into the coupling groove 1182, the stator 1100 and the insulating unit 1300 may not rotate relative to each other.

The coupling protrusion 1352 may be provided in plurality. In the illustrated embodiment, the coupling protrusion 1352 may comprise one first coupling protrusion 1352a formed on a first insulation tooth 1320a, and two second coupling protrusions 1352b formed on a second insulation tooth 1320b.

The number and position of the coupling protrusion 1352 may change to correspond to the number and position of the coupling groove 1182.

However, the coupling protrusions 1352 facing each other may be different in number and position. As illustrated in the embodiment, when the first coupling protrusion 1352a and the second coupling protrusion 1352b are different from each other in number and position, the insulating unit 1300 and the stator 110 can be prevented from being coupled in an incorrect direction.

Figure 10A:
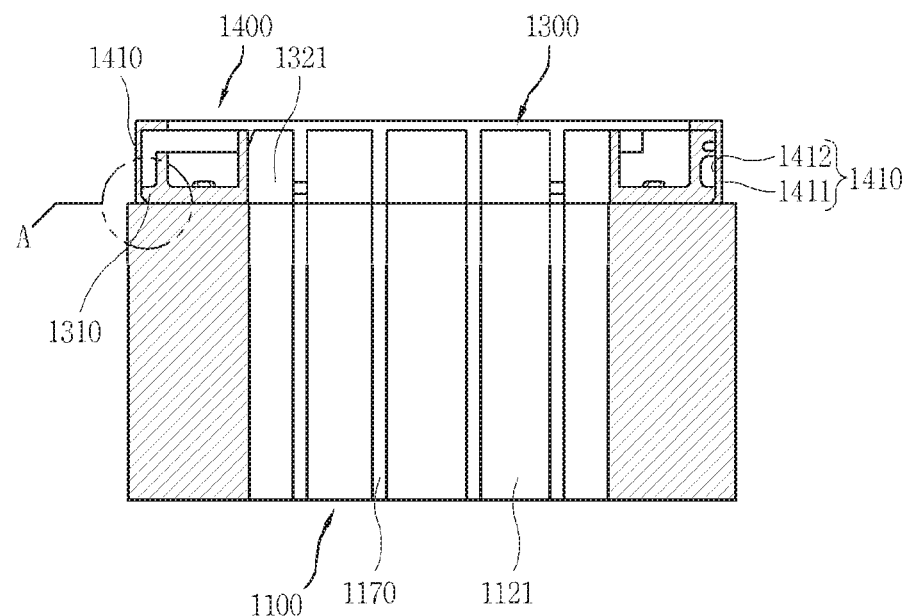
FIG. 10A is a cross-sectional view illustrating a coupling relationship of the motor part of FIG. 4 in accordance with an embodiment of the present disclosure.
Figure 10B:
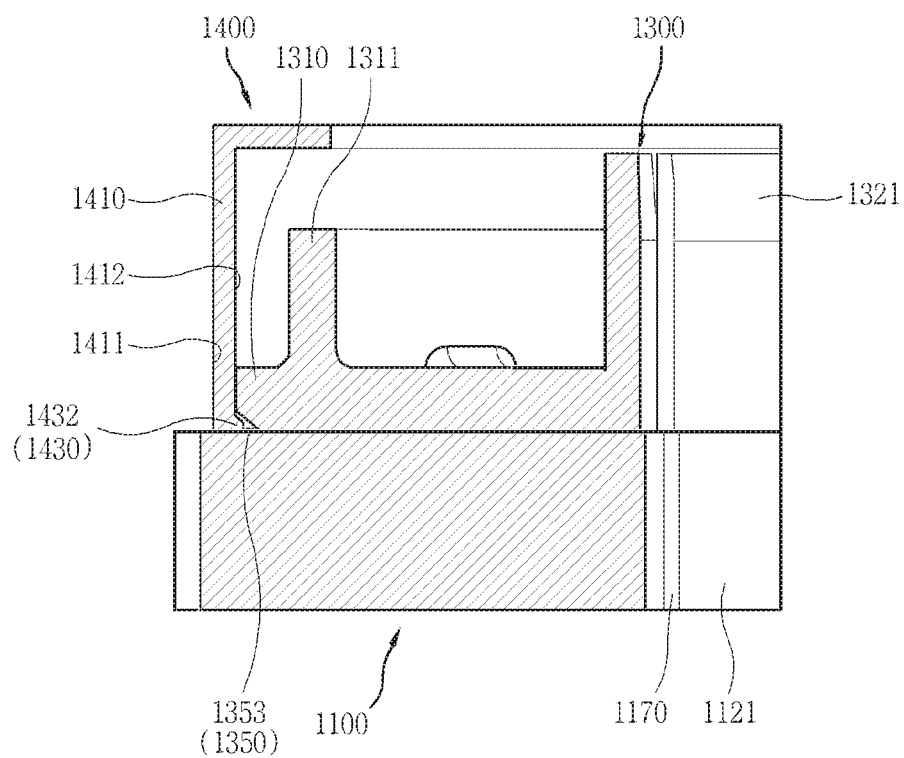
FIG. 10B is an enlarged cross-sectional view illustrating a state (A of FIG. 10A) in which a snap protrusion is accommodated in a snap coupling portion in accordance with an embodiment of the present disclosure.

A snap coupling portion 1353 may be configured to hold the coupling between the insulating unit 1300 and the insulating housing 1400 to prevent such coupling from being randomly released after they are coupled to each other (see FIGS. 10A-10B).

The snap coupling portion 1353 may snap to a snap protrusion 1432 of the insulating housing 1400. As will be described later, the insulating housing 1400 may be formed of an elastic material to allow deformation of its shape to some degree.

The snap coupling portion 1353 may be formed as a groove in one side of the insulation outer circumferential portion 1310 facing the stator 1100 so that the snap protrusion 1432 can be inserted and coupled.

The snap protrusion 1432 may be moved along the outer circumferential surface of the insulating unit 1300 and may be deformed in shape radially outward by a predetermined distance. When the snap protrusion 1432 reaches the snap coupling portion 1353, the snap protrusion 1432 may be inserted into the snap coupling portion 1353.

As a result, the insulating unit 1300 and the insulating housing 1400 may be firmly coupled so that they cannot be arbitrarily separated from each other.

(4) Description of the Insulating Housing 1400

The insulating housing 1400 may be configured to cover end portions of the insulating unit 1300 and the stator 1100. The insulating unit 1300 may be provided in plurality on both end portions of the stator 1100 in the lengthwise direction of the stator 1100. Therefore, the insulating housing 1400 may also be provided in plurality on the both end portions of the stator 1100 in the lengthwise direction.

Specifically, the insulating housing 1400 may comprise a first insulating housing 1400a and a second insulating housing 1400b. The first insulating housing 1400a may be coupled to one end portion of the stator 1100 facing the inverter part 300. The second insulating housing 1400b may be coupled to one end portion of the stator 1100, which is opposite to the one end portion, namely, faces the rear housing 200.

The first insulating housing 1400a and the second insulating housing 1400b may have the same structure and function except for that only the first insulating housing 1400a may be provided with a terminal accommodating portion 1440 to be described below. Hereinafter, the first insulating housing 1400a and the second insulating housing 1400b will be described as the insulating housing 1400.

The insulating housing 1400 may firmly maintain the coupling between the stator 1100 and the insulating unit 1300. In addition, the insulating housing 1400 may prevent the stator 1100 and the insulating unit 1300 from being exposed to outside, thereby suppressing contamination of the stator 1100 or the insulating unit 1300 due to foreign substances inside the motor room 1000.

The insulating housing 1400 may be formed of an insulating material. The insulating housing 1400 may be formed of a material which has low thermal conductivity and is nonconductive. In addition, the insulating housing 1400 may be formed of an elastic material to allow deformation of its shape to some degree. In one embodiment, the insulating housing 1400 may be formed of synthetic resin or the like.

In the illustrated embodiment, the insulating housing 1400 may be formed in a ring shape having a housing opening 1420 therein. This is for the insulating housing 1400 to cover the stator 1100 and the insulating unit 1300 in a manner of rotatably accommodating the rotor 1200.

The insulating housing 1400 may comprise a housing outer circumferential portion 1410, a housing opening 1420, a housing coupling portion 1430, and a terminal accommodating portion 1440.

The housing outer circumferential portion 1410 may define an outer circumference of the insulating housing 1400. The insulating housing 1400 may have a ring shape, and thus it may be understood that the housing outer circumferential portion 1410 may form a body of the insulating housing 1400.

The housing outer circumferential portion 1410 may extend in the lengthwise direction of the insulating housing 1400, namely, in the back and forth direction in the illustrated embodiment. The housing outer circumferential portion 1410 may be formed to extend the same as or longer than the stepped portion 1311 of the insulating unit 1300, so as to fully cover the insulating outer circumferential portion 1310.

The housing outer circumferential portion 1410 may comprise a housing outer circumferential surface 1411 and a housing inner circumferential surface 1412.

The housing outer circumferential surface 1411 may define an outer surface of the insulating housing 1400. Since the insulating housing 1400 may be formed in the cylindrical shape, the housing outer circumferential surface 1411 may define a cylindrical side surface.

The housing inner circumferential surface 1412 may define an inner surface of the insulating housing 1400. When the insulating housing 1400 is coupled to the stator 1100 and the insulating unit 1300, the housing inner circumferential surface 1412 may be brought into contact with the outer circumferential surface of the insulating unit 1300.

The coupling key 1431 may protrude radially inward from the housing inner circumferential surface 1412. In addition, a snap protrusion 1432 may protrude radially inward from one end portion of the housing inner circumferential surface 1412 facing the stator 1100, namely, a front end portion in the illustrated embodiment.

The housing opening 1420 may be a space partitioned by the housing outer circumferential portion 1410. The rotor 1200 may be inserted through the housing opening 1420 so as to be rotatably accommodated in the rotor accommodating portion 1160 of the stator 1100.

In the illustrated embodiment, the housing outer circumferential portion 1410 may have a circular cross-section, and thus the housing opening 1420 is also formed as a space having a circular outer circumference. The housing opening 1420 may have an arbitrary shape through which the rotor 1200 can be inserted.

The housing coupling portion 1430 may be a portion where the insulating housing 1400 is coupled to the stator 1100 and the insulating unit 1300. By the housing coupling portion 1430, the insulating housing 1400 can be firmly coupled to the stator 1100 and the insulating unit 1300.

The housing coupling portion 1430 may comprise a coupling key 1431 and a snap protrusion 1432.

The coupling key 1431 may be inserted into the coupling slot 1351 of the insulating unit 1300. The coupling key 1431 may protrude radially inward from the housing inner circumferential surface 1412. In addition, the stepped portion 1311 may protrude from the insulation outer circumferential portion 1310.

Therefore, unless the coupling key 1431 is inserted into the coupling slot 1351, the insulating housing 1400 may not be coupled to be in close contact with the insulating unit 1300. That is, the coupling key 1431 may constrain, together with the coupling slot 1351, the insulating housing 1400 to be coupled with the insulating unit 1300 in a specific direction.

In addition, since the coupling key 1431 is inserted into the coupling slot 1351, the insulating housing 1400 and the insulating unit 1300 may not be relatively rotated after being coupled to each other. Accordingly, the coupling between the insulating housing 1400 and the insulating unit 1300 can be stably maintained.

In the illustrated embodiment, the coupling key 1431 may be provided by one in number and may have an outer circumference in a rectangular pillar shape. The number and shape of the coupling key 1431 may be determined according to the number and shape of the coupling slot 1351.

The snap protrusion 1432 may be a portion where the insulating housing 1400 snaps to the insulating unit 1300. The snap protrusion 1432 may protrude radially inward from an end portion of the housing inner circumferential surface 1412 facing the stator 1100.

The snap protrusion 1432 may be inserted into the snap coupling portion 1353. As described above, the insulating housing 1400 may be formed of a material having predetermined elasticity.

While the snap protrusion 1432 may move along an outer surface of the insulation outer circumferential portion 1310, the housing outer circumferential portion 1410 may be deformed radially outward.

When the snap protrusion 1432 reaches the snap coupling portion 1353, the snap protrusion 1432 may be inserted into the snap coupling portion 1353, and the housing outer circumferential portion 1410 may be restored to its original shape.

Accordingly, the insulating housing 1400 and the insulating unit 1300 can be stably coupled to each other.

The terminal accommodating portion 1440 may accommodate the electric connection unit 1500 to be described later. In detail, the terminal accommodating portion 1440 may accommodate therein a terminal unit 1510 of the electric connection unit 1500 in a detachable manner. The terminal unit 1510 accommodated in the terminal accommodating portion 1400 may be electrically connected to the stator 1100 by a separate conductor wire (not shown).

In the illustrated embodiment, the terminal accommodating portion 1440 may be formed on one side of the housing outer circumferential portion 1410.

When the insulating housing 1400 and the insulating unit 1300 are coupled to each other, the terminal accommodating portion 1440 may be aligned with the housing slot 1312. When the terminal accommodating portion 1440 and the housing slot 1312 are coupled to each other, the insulating housing 1400 and the insulating unit 1300 may not rotate relative to each other.

The terminal accommodating portion 1440 may comprise a terminal space 1441. The terminal space 1441 may be a space in which the terminal unit 1510 is accommodated. The terminal space 1441 may have an opening at one side facing the inverter part 300, namely, at the rear side in the illustrated embodiment. The terminal unit 1510 may be accommodated in the terminal space 1441 only through the opening.

An opening may also be formed at one side of the terminal space 1441 facing the rear housing 200, namely, at the front side in the illustrated embodiment. A conductor wire (not shown) may be inserted into the opening to electrically connect the terminal unit 1510 accommodated in the terminal space 1441 and the stator 1100.

In the illustrated embodiment, the terminal space 1441 may be configured by totally three spaces, including a first terminal space 1441a, a second terminal space 1441b, and a third terminal space 1441c. The number and shape of the terminal space 1441 may be determined according to the number and shape of the terminal unit 1510.

The electric connection unit 1500 may electrically connect the inverter part 300 and the motor part 1000. Power and control signal applied to the inverter part 300 from outside may be transmitted to the stator 1100 through the electric connection unit 1500. The stator 1100 may form an electromagnetic field according to the received power and control signal, so that the rotor 1200 can rotate.

The electric connection unit 1500 may be detachably coupled to the inverter part 300 and the stator 1100. By the electric connection unit 1500, a complicated wiring structure for electrically connecting the inverter part 300 and the stator 1100 may not be needed.

The electric connection unit 1500 may comprise a terminal unit 1510 and a connector unit 1520.

The terminal unit 1510 may electrically connect the connector unit 1520 and the stator 1100 to each other. Power and control signal transmitted through the connector unit 1520 may be transmitted to the stator 1100 via the terminal unit 1510.

The terminal unit 1510 may be detachably inserted into the terminal accommodating portion 1440.

In the illustrated embodiment, the terminal unit 1510 may be configured by totally three units, including a first terminal unit 1510a, a second terminal unit 1510b, and a third terminal unit 1510c. The first, second and third terminal units 1510a, 1510b, and 1510c may be detachably inserted into the terminal spaces 1441a, 1441b, and 1441c, respectively.

This is because the currents applied to the stator 1100 may include three-phase currents of the U phase, the W phase, and the V phase, as described above. The number of the terminal unit 1510 may vary depending on the number of phases of the applied current.

The terminal unit 1510 may be formed of a conductive material to allow a current to flow. In addition, the terminal unit 1510 may be formed of a material having predetermined elasticity.

The terminal unit 1510 may comprise a terminal body 1511, a terminal clip 1512, a connector connecting portion 1513, and a stator connecting portion 1514.

The terminal body portion 1511 may define a body of the terminal unit 1510. A size of the terminal body 1511 may be determined to correspond to a size of the terminal accommodating portion 1440.

The terminal clip 1512 may be provided on one side of the terminal body 1512. The terminal clip 1512 may be deformable in a direction toward the terminal body 1511 and in a direction away from the terminal body 1511.

In a state where the terminal unit 1510 is not inserted into the terminal space 1441, the terminal clip 1512 may be positioned to be inclined (leaned, deformed) away from the terminal body 1511. That is, in this state, the size of the terminal unit 1510 may be larger than the size of the terminal space 1441.

When the terminal unit 1510 is inserted into the terminal space 1441, the terminal clip 1512 may be positioned to be pushed (inclined, deformed) toward the terminal body 1511. As a result, an elastic force toward an inner wall of the terminal space 1441 may be stored in the terminal clip 1512. The elastic force stored in the terminal clip 1512 may prevent the terminal unit 1510 from being randomly separated from the terminal space 1441.

An electric member 1522 of the connector unit 1520 may be electrically connected to the connector connecting portion 1513. The electric member 1522 may be detachably inserted into the connector connecting portion 1513.

The stator connecting portion 1514 may be a portion where the terminal unit 1510 and the stator 1100 are connected electrically to each other. The stator connecting portion 1514 and the stator 1100 may be electrically connected to each other by a conductor wire (not shown) or the like.

The connector unit 1520 may transfer power and control signal transmitted from the inverter part 300 to the terminal unit 1510.

The connector unit 1520 may be electrically connected to the inverter part 300. In addition, the connector unit 1520 may be detachably coupled to the inverter part 300.

The connector unit 1520 may be electrically connected to the terminal unit 1510. The connector unit 1520 may also be electrically connected to the terminal unit 1510.

The connector unit 1520 may comprise a support member 1521, an electric member 1522, and an insulating member 1523.

The support member 1521 may define a body of the terminal unit 1520. The electric member 1522 may be inserted through the support member 1521. When the connector unit 1520 is coupled to the inverter part 300, the support member 1521 may be inserted into a support member insertion groove 312a.

The support member 1521 may be inserted into the support member insertion groove 312a so as not to protrude from the support member insertion groove 312a. That is, one side surface of the support member 1521 facing the stator 1100 and one side surface of the inverter housing 310 facing the stator 1100 may be flush with each other.

The support member 1521 may comprise a coupling opening 1521a. The coupling opening 1521a may be formed through the support member 1521 in a lengthwise direction of the support member 1521, namely, in the back and forth direction in the illustrated embodiment.

In the illustrated embodiment, the coupling opening 1521a may be totally provided by two in number, and the two coupling openings 1521a may be formed through upper and lower sides of the support member 1521, respectively. The position and number of the coupling opening 1521a may be determined depending on the position and number of the coupling hole 312c of the inverter part 300.

A coupling member (not shown) may be coupled to the coupling opening 1521a. The coupling member (not shown) may be inserted into both the coupling opening 1521a and the coupling hole 312c. As a result, the connector unit 1520 can be stably coupled with the inverter part 300.

The electric member 1522 may be a passage through which power and control signal applied from the inverter part 300 are transmitted to the terminal unit 1510. The electric member 1522 may be formed of a conductive material.

The electric member 1522 may be inserted through the support member 1521. In the illustrated embodiment, three of the electric members 1522 may be inserted through the support member 1521. This is because the currents applied may be three-phase currents, as described above.

The electric member 1522 may comprise an inverter connection end portion 1522a and a terminal connection end portion 1522b.

The inverter connection end portion 1522a may be a portion where the electric member 1522 is electrically connected to the inverter part 300 in a detachable manner. The inverter connection end portion 1522a may be defined as one end portion of the electric member 1522 facing the inverter part 300.

When the connector unit 1520 is coupled to the inverter part 300, the inverter connection end portion 1522a may be inserted into the electric member insertion opening 312b of the inverter housing 310. The inserted inverter connection end portion 1522a may be electrically connected to the inverter device (not shown) accommodated in the inverter chamber S1. Accordingly, power and control signal may be transmitted to the electric member 1522 from the inverter device (not shown).

The terminal connection end portion 1522b may be a portion where the electric member 1522 is electrically connected to the terminal unit 1510 in a detachable manner. The terminal connection end portion 1522b may be defined as another end portion of the electric member 1522 facing the stator 1100.

When the connector unit 1520 is coupled to the terminal unit 1510, the terminal connection end portion 1522b may be electrically connected to the connector connecting portion 1513 of the terminal unit 1510. Accordingly, the power and control signal transmitted to the electric member 1522 may be transmitted to the stator 1100 via the terminal unit 1510.

The insulating member 1523 may surround the electric member 1522 so that the electric member 1522 is not connected to the other members except for the inverter part 300 and the terminal unit 1510. In addition, the insulating member 1523 may be configured to be fitted into the electric member insertion opening 312b of the inverter part 300, so as to prevent the inserted electric member 1522 from being arbitrarily detached.

The insulating member 1523 may be inserted through the support member 1521. That is, the electric member 1522 inserted through the support member 1521 may be located between the support member 1521 and the insulating member 1523.

The insulating member 1523 may be formed of an insulating material. In addition, the insulating member 1523 may be formed of an elastic material so as to be deformable to some degree. In one embodiment, the insulating member 1523 may be formed of rubber or the like.

An outer diameter of the insulating member 1523 may be equal to or larger than an inner diameter of the electric member insertion opening 312b of the inverter part 300. The insulating member 1523 may be fitted into the electric member insertion opening 312b, and thus its arbitrary separation may be prevented.

The motor part 1000 according to the embodiment may comprise the insulating unit 1300 configured to improve an insulation performance. In addition, the insulating unit 1300 and the insulating housing 1400 configured to cover the insulating unit 1300 may comprise members that can be easily coupled to the stator 1100.

Hereinafter, the coupling relationship of the motor part 1000 according to the embodiment will be described in detail with reference to FIGS. 5 to 13.

Figure 5:
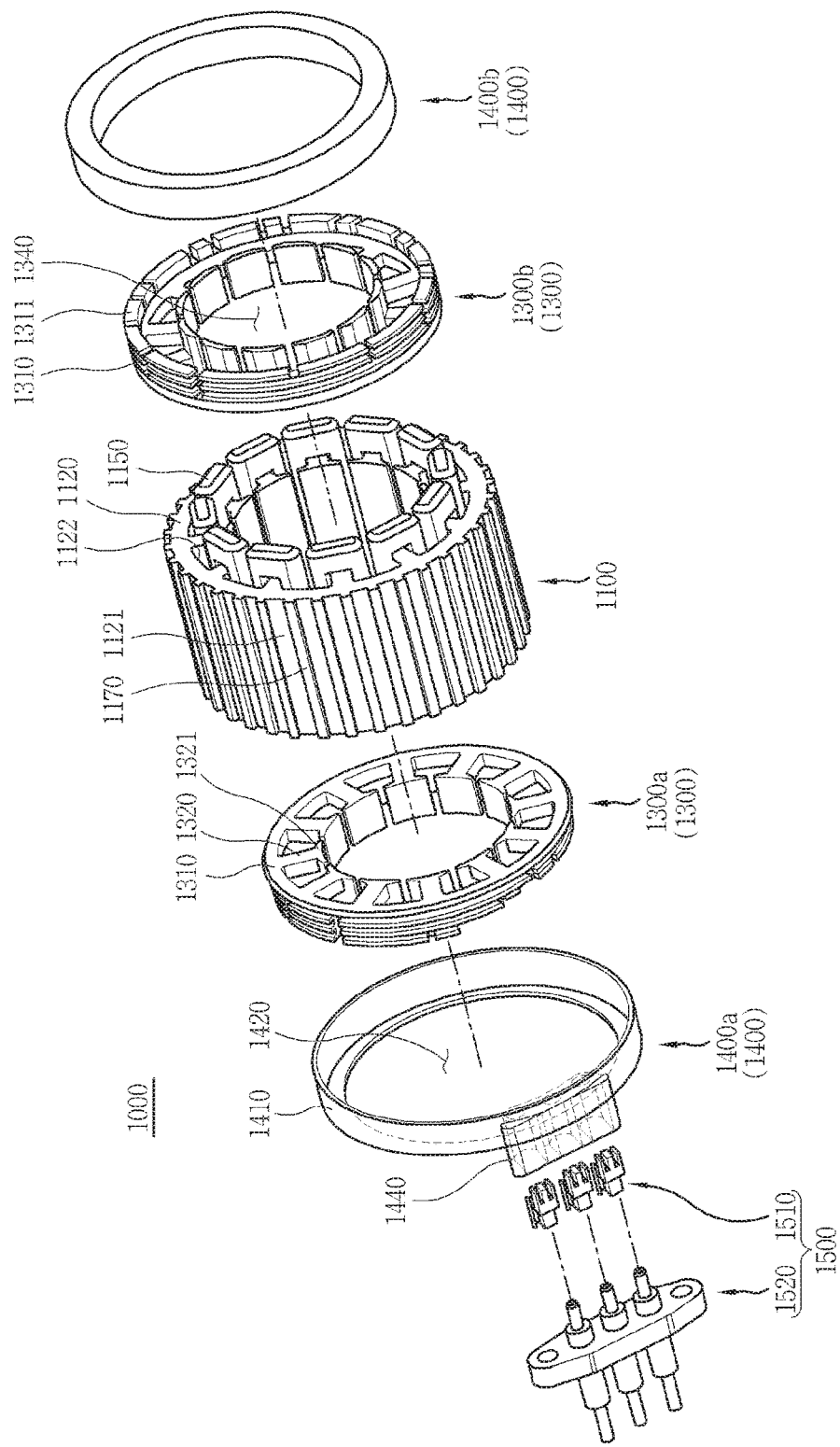
FIG. 5 is an exploded perspective view of the motor part of FIG. 4 in accordance with an embodiment of the present disclosure.

Referring to FIG. 5, the insulation unit 1300 may be coupled to each of both end portions of the stator 1100 in the lengthwise direction of the stator 1100, namely, in the front end portion and the rear side portion in the illustrated embodiment.

Figure 6:
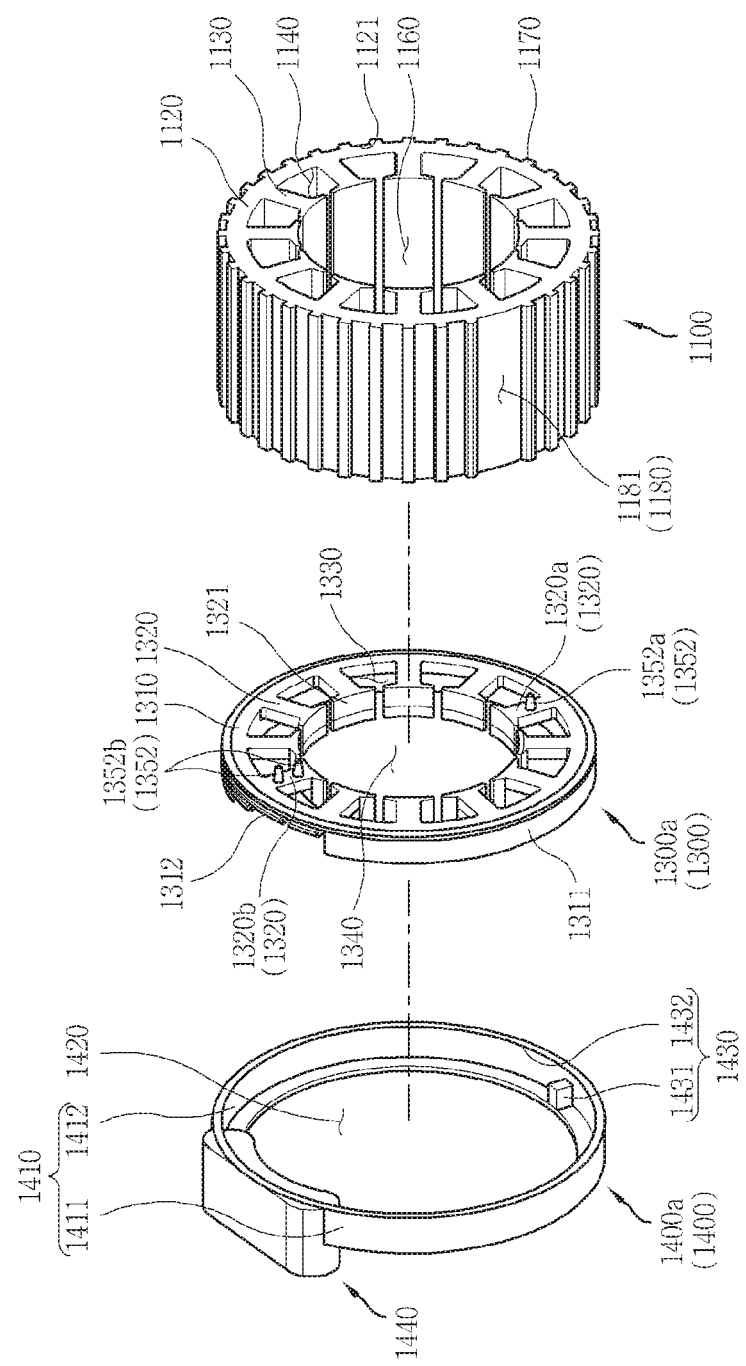
FIG. 6 is an exploded perspective view illustrating a coupling relationship of a stator, an insulating unit, and an insulating housing constituting the motor part of FIG. 4 in accordance with an embodiment of the present disclosure.

Referring to FIG. 6, the coupling protrusion 1352 may protrude from one side surface of the corresponding insulation tooth 1320 of the insulating unit 1300 facing the stator 1100. The coupling protrusion 1352 may be provided in plurality, and having asymmetric positions and numbers on the cross-section of the insulating unit 1300.

Figure 7:
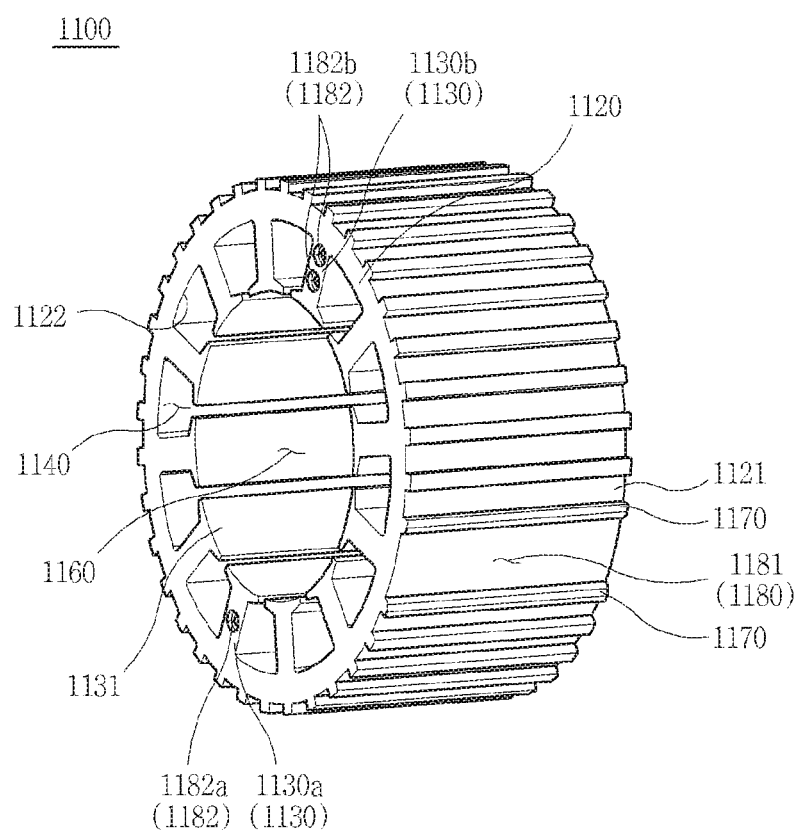
FIG. 7 is a perspective view of the stator constituting the motor part of FIG. 4 in accordance with an embodiment of the present disclosure.

As illustrated in FIG. 7, a plurality of coupling grooves 1182 may be recessed into the teeth 1130 of the stator 1100. The number and position of the coupling groove 1182 may correspond to the number and position of the coupling protrusion 1352.

The coupling groove 1182 may be provided in plurality, having asymmetric positions and numbers on the cross-section of the stator 1100. Although not illustrated in FIG. 6, the coupling groove 1182 may also be recessed into the front side surface of the stator 1100, like the rear side surface of the stator 1100.

The stator 1100 and the insulating unit 1300 may be coupled only in a direction in which the asymmetrically formed coupling protrusions 1352 can be inserted into the coupling grooves 1182. That is, the stator 1100 and the insulating unit 1300 may be coupled to each other only in a direction in which the first coupling protrusion 1352a may be inserted into the first coupling groove 1182a and the second coupling protrusion 1352b may be inserted into the second coupling groove 1182b, respectively.

This can prevent the stator 1100 and the insulating unit 1300 from being coupled in an incorrect direction, so that the stator 1100 and the insulating unit 1300 can be stably coupled in a desired direction.

In addition, referring to FIG. 13, the stator 1100 may be accommodated in the motor room 110 formed in the main housing 100. The plurality of insulating protrusions 1170 may protrude from the outer circumferential surface 1121 of the stator 1100 in the circumferential direction.

Therefore, when the stator 1100 is accommodated in the motor room 110, the second surfaces 1172 of the plurality of insulating protrusions 1170 may be brought into contact with the inner circumferential surface of the motor room 110.

In this case, the coupling space 1181, in which the adjacent insulating protrusions 1170 are spaced apart from each other by a distance, which is different from a spaced distance of the other insulating protrusions 1170, may be formed in the second region 1121b of the outer circumferential surface 1121 of the stator 1100.

Correspondingly, the coupling protrusion 111 may protrude from the inner circumferential surface of the motor room 110.

Therefore, the stator 1100 can be accommodated in the motor room 110 only in a direction in which the coupling protrusion 111 is inserted into the coupling space 1181.

This can prevent the stator 1100 from being accommodated in the motor room 110 in an incorrect direction, so that the stator 1100 can be inserted in a desired direction to be stably accommodated in the motor room 110.

Referring to FIG. 6, the insulating housing 1400 may be coupled to one side of the insulating unit 1300 opposite to the stator 1100. The insulating unit 1300 may be coupled to each of the both ends of the stator 1100 in the lengthwise direction of the stator 1100, and the insulating housing 1400 may also be provided on each of the both end portions of the stator 1100 in the lengthwise direction (see FIG. 5).

The coupling key 1431 may protrude from the inner circumferential surface 1412 of the insulating housing 1400. In addition, the coupling slot 1351, which may be a space formed as the stepped portions 1311 are spaced apart from each other, may be formed on the insulation outer circumferential portion 1310 of the insulating unit 1300 (see FIG. 9).

The stepped portion 1311 may protrude from a portion, on which the coupling slot 1351 is not formed, on the insulation outer circumferential portion 1310. Therefore, due to the presence of the coupling key 1431 of the insulating housing 1400, the insulating unit 1300 and the insulating housing 1400 can be coupled only in a direction in which the coupling key 1431 can be accommodated in the coupling slot 1351.

Referring to FIGS. 10A-10B, the snap protrusion 1432 may protrude radially inward from an end portion of the housing inner circumferential surface 1412 of the insulating housing 1400. In addition, the snap coupling portion 1353 may be recessed into one side of the insulation outer circumferential portion 1310 of the insulating unit 1300 facing the stator 1100.

As the coupling between the insulating unit 1300 and the insulating housing 1400 proceeds, the snap protrusion 1432 may move along the outer circumferential surface of the insulation outer circumferential portion 1310. The insulating housing 1400 may be formed of a material having predetermined elasticity, and the housing outer circumferential portion 1410 of the insulating housing 1400 may move while being widened radially outward.

When the snap protrusion 1432 reaches the snap coupling portion 1353, the snap protrusion 1432 may be inserted into the snap coupling portion 1353 (see FIG. 10B).

The snap protrusion 1432 and the snap coupling portion 1353 may be configured in a structure that the snap protrusion 1432 moves in one direction to be inserted into the snap coupling portion 1353 but may be restricted from being detached from the snap coupling portion 1353 when the snap protrusion 1432 moves reversely.

This can prevent the insulating unit 1300 and the insulating housing 1400 from being coupled in an incorrect direction, so that the insulating unit 1300 and the insulating housing 1400 can be stably coupled in a desired direction.

In addition, the insulating unit 1300 and the insulating housing 1400 may be coupled to each other as the snap coupling portion 1353 and the snap protrusion 1432 are snapped to each other. Accordingly, when an intentional external force is not applied, the insulating unit 1300 and the insulating housing 1400 may not be arbitrarily separated from each other.

Figure 11:
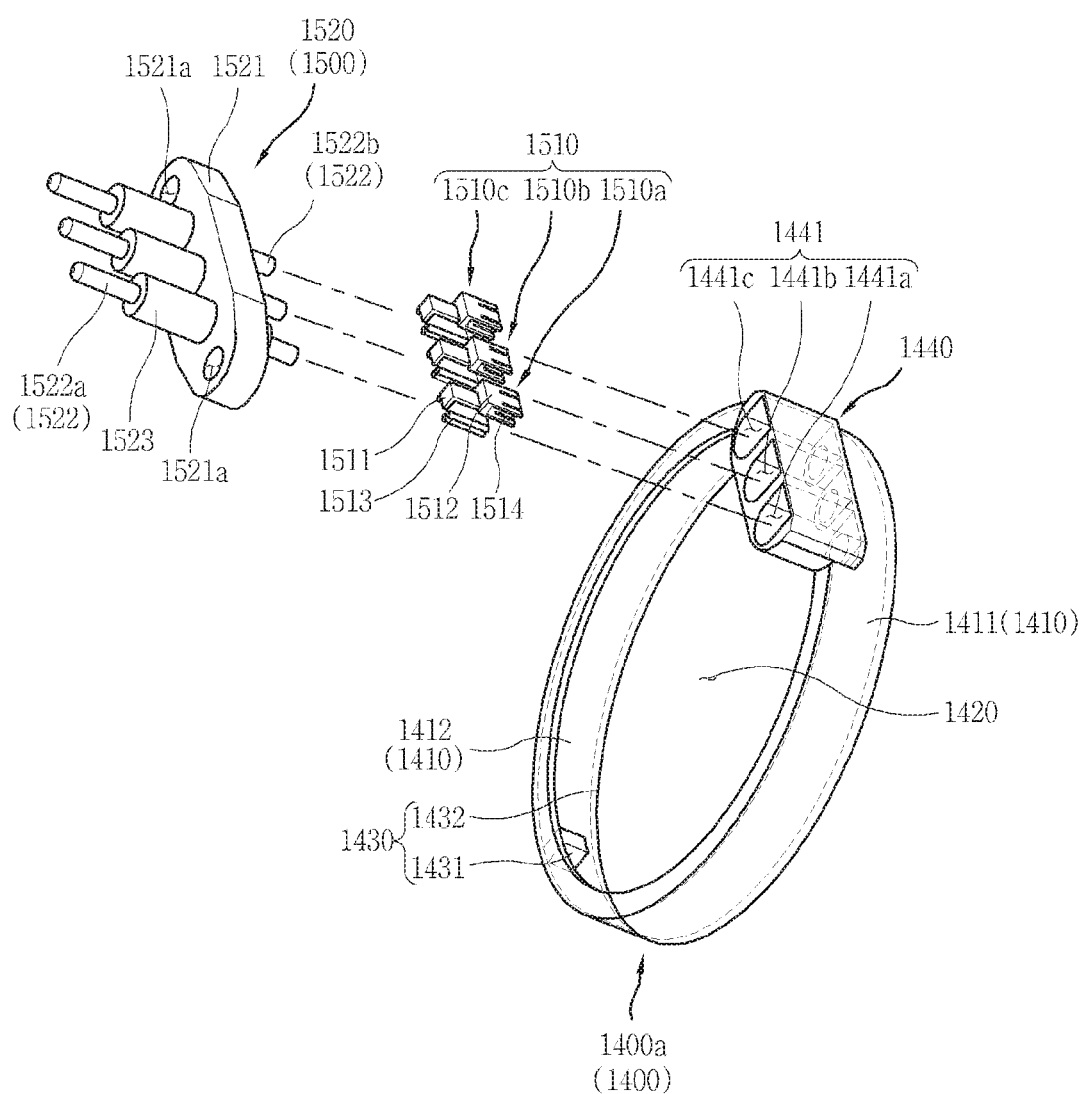
FIG. 11 is an exploded perspective view illustrating a coupling relationship of an electric connection unit and an insulating housing in accordance with an embodiment of the present disclosure.

Referring to FIG. 11, a process in which the electric connection unit 1500 and the insulating housing 1400 are coupled is illustrated.

The terminal unit 1510 of the electric connection unit 1500 may be accommodated in the terminal accommodating portion 1440 of the insulating housing 1400. In the illustrated embodiment, the terminal unit 1510 may be provided by three in number, including the first terminal unit 1510a, the second terminal unit 1510b, and the third terminal unit 1510c.

The first, second and third terminal units 1510a, 1510b, and 1510c may be accommodated in the first terminal space 1441a, the second terminal space 1441b and the third terminal space 1441c, respectively. In this case, as described above, the terminal unit 1510 may not be detached arbitrarily from the terminal space 1441 by virtue of an elastic force stored as the terminal clip 1512 of the terminal unit 1510 is compressed.

The terminal connection end portion 1522b of the electric member 1522 of the connector unit 1520 may be detachably coupled to the connector connecting portion 1513 of the terminal unit 1510. In one embodiment, the terminal connection end portion 1522b may be inserted into the connector connecting portion 1513.

Although not shown, a conductor wire (not shown) for electrically connecting the terminal unit 1510 and the stator 1100 may be provided. One side of the conductor wire (not shown) may be electrically connected to the stator 1100, and another side of the conductor wire (not shown) may be electrically connected to the stator connecting portion 1514 of the terminal unit 1510 in a detachable manner.

Therefore, the connection among the stator 1100, the terminal unit 1510, and the connector unit 1520 can be simplified.

Referring to FIG. 12, a process in which the electric connection unit 1500 and the inverter part 300 are coupled is illustrated.

The connector unit 1520 of the electric connection unit 1500 may be electrically connected to the inverter part 300 in a detachable manner.

In detail, the support member 1521 of the connector unit 1520 may be inserted into the support member insertion groove 312a of the inverter part 300. In addition, the inverter connection end portion 1522a of the electric member 1522 of the connector unit 1520 may be inserted into the electric member insertion opening 312b of the inverter part 300.

The inverter connection end portion 1522a may be electrically connected to the inverter device (not shown) accommodated in the inverter chamber S1, so as to receive power and control signal.

When the coupling between the connector unit 1520 and the inverter part 300 is completed, a coupling member (not shown) may maintain the coupling firmly. The coupling member (not shown) may penetrate through the coupling opening 1521a and the coupling hole 312c to fasten the connector unit 1520 and the inverter part 300.

In addition, the insulating housing 1400 to which the electric connection unit 1500 is detachably coupled may be in contact with the inverter part 300. Specifically, one side surface of the outer circumferential portion 1410 of the insulating housing 1400 facing the inverter part 300 may be brought into contact with one side surface of the inverter housing 310 facing the stator 1100.

In this case, the central axis of the insulating housing 1400 and the central axis of the rotational shaft supporting portion 311 may be coaxially arranged as described above.

Accordingly, the inverter part 300 and the electric connection unit 1500 may be electrically connected to each other only by inserting the connector unit 1520 into the support member insertion groove 312a and the electric member insertion opening 312b of the inverter part 300. Therefore, the structure can be simplified.

In addition, after the connector unit 1520 and the inverter part 300 are coupled to each other, they may be coupled by the coupling member (not shown), so that the coupled state can be maintained firmly.

Figure 14:
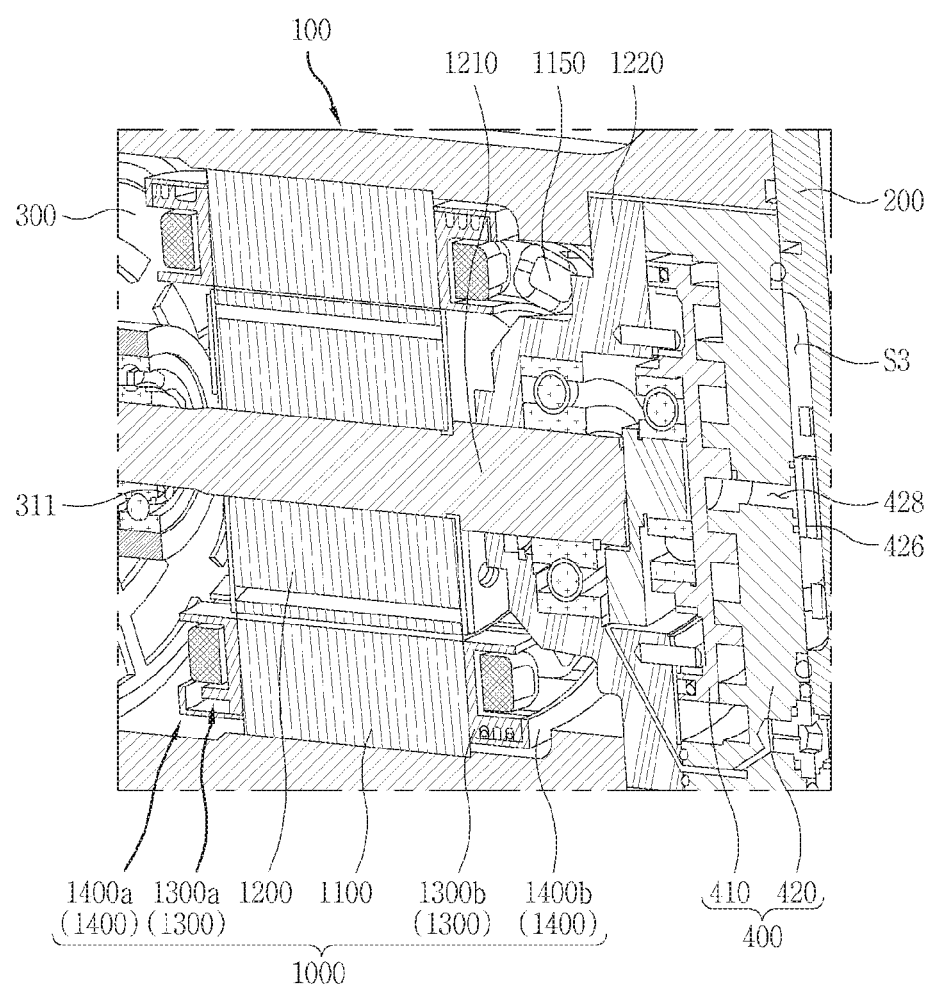
FIG. 14 is a cross-sectional view illustrating a state in which a motor part is accommodated in an electric compressor in accordance with an embodiment of the present disclosure.

Referring to FIG. 14, a state in which the motor part 1000 coupled as described above is accommodated in the motor room 110 of the electric compressor 10 is illustrated.

The inverter part 300 may be located at one side of the motor part 1000, namely, at the rear side in the illustrated embodiment. The rotational shaft 1210 may be rotatably coupled to the rotational shaft supporting portion 311 of the inverter part 300.

Although not shown, the inverter part 300 and the motor part 1000 may be electrically connected by the electric connection unit 1500 as described above.

The compression part 400 may be located at another side of the motor part 1000, namely, at the front side in the illustrated embodiment. The orbiting scroll 410 of the compression part 400 may be connected to the rotational shaft 1210 to rotate integrally with the rotational shaft 1210.

The insulating unit 1300 and the insulating housing 1400 may be sequentially coupled to each of the both end portions of the stator 1100 in the lengthwise direction of the stator 1100.

The first insulating portion 1300a and the first insulating housing 1400a may be provided on one end portion of the stator 1100 adjacent to the inverter part 1300.

The first insulating housing 1400a may be provided with the terminal accommodating portion 1440 to which the electric connection unit 1500 for electrically connecting the inverter part 300 and the motor part 1000 is connected. The first insulating portion 1300a may be provided with the housing slot 1312 so that the terminal accommodating portion 1440 can be stably coupled to the housing slot 1312.

The second insulating portion 1300b and the second insulating housing 1400b may be provided on another end portion of the stator 1100 adjacent to the compression part 400. Since an electric connection is not needed in the above direction, the second insulating portion 1300b and the second insulating housing 1400b may not be provided with a separate member for connecting the electric connection unit 1500.

The insulating unit 1300 and the insulating housing 1400 may be configured to cover the end portions of the stator 1100 in the lengthwise direction of the stator 1100. Thus, the coils 1150 of the stator 1100 may not be exposed radially outward or inward. Accordingly, insulation efficiency of the motor part 1000 can be improved.

The motor part 1000 according to the embodiment disclosed herein may be configured such that a refrigerant is introduced in each space between adjacent insulating protrusions 1170 of the plurality of insulating protrusions 1170 formed on the outer circumferential surface 1121 of the stator 1100. This structure can improve a cooling effect of the motor part 1000.

Hereinafter, a process in which a refrigerant flows in the electric compressor 10 according to the exemplary embodiment will be described in detail with reference to FIG. 15.

When power and control signal are applied to the motor part 1000 to operate the electric compressor 10, a refrigerant may be introduced into the electric compressor 10 through the intake port 120. The introduced refrigerant may flow inside the motor room 110 of the electric compressor 10 and then move toward the compression part 400 (see (a) of FIG. 15).

Since the intake port 120 may be positioned adjacent to the inverter part 300, the refrigerant may pass through the motor part 1000 and moves toward the compression part 400. The plurality of insulating protrusions 1170 may protrude by predetermined distances from the outer circumferential surface 1121 of the stator 1100 that defines the outer surface of the motor part 1000. A predetermined space may be formed between the adjacent insulating protrusions 1170.

In addition, the insulating protrusions 1170 may extend in the lengthwise direction of the stator 1100. Therefore, the space formed between the adjacent insulating protrusions 1170 may form a flow path through which the refrigerant can flow from the inverter part 300 toward the compression part 400.

The refrigerant may cool the heated motor part 1000 while flowing through the space. In addition, the spaces and the insulating protrusions may be continuously disposed in an alternating manner along the circumferential direction of the stator 1100, and thus the refrigerant can cool the overall outer circumferential surface 1121 of the stator 1100.

Figure 15:
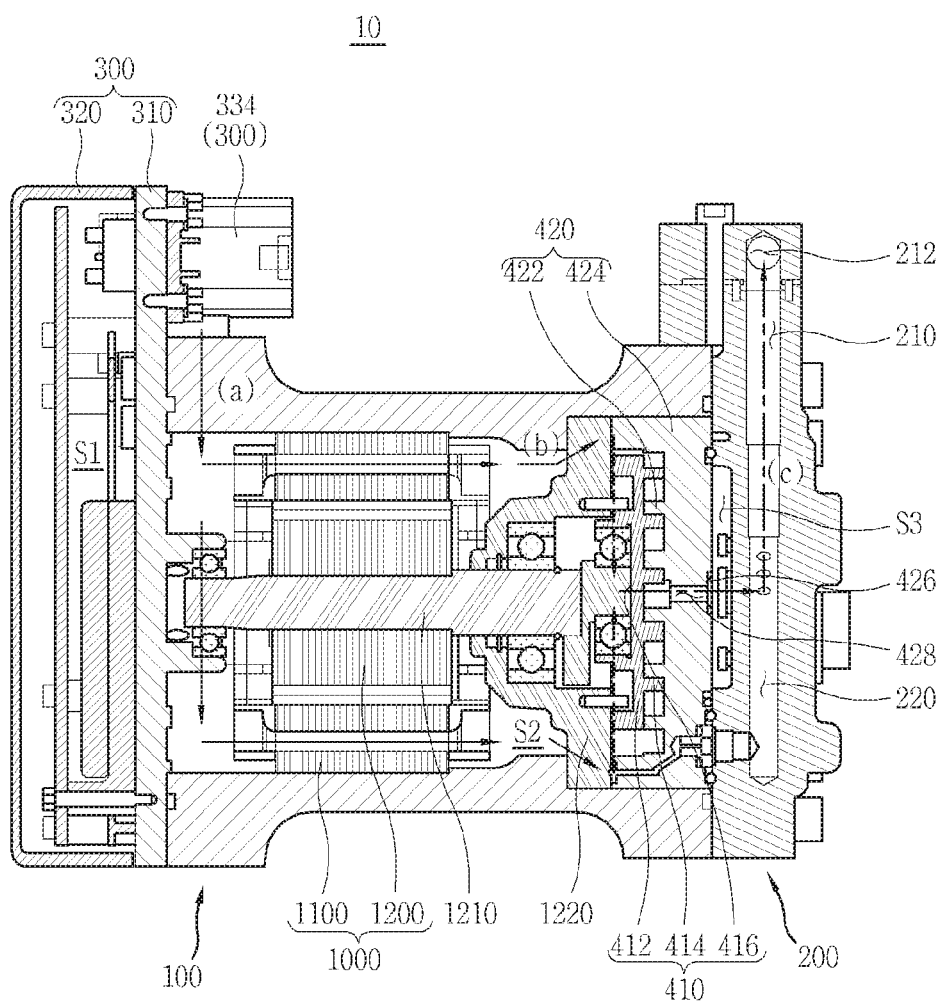
FIG. 15 is a cross-sectional view illustrating a path along which a refrigerant flows inside an electric compressor in accordance with an embodiment of the present disclosure.

After reaching the compression part 400, the refrigerant may be compressed by the rotation of the orbiting scroll 410 (see (b) of FIG. 15) and then discharged to the exhaust port 212 through the exhaust passage 210 via the discharge chamber S3 (see (c) of FIG. 15).

In FIG. 15, it will be understood that pressure of the refrigerant may increase as each line indicating the flow of the refrigerant moves from (a) to (c).

Therefore, the refrigerant introduced into the electric compressor 10 can cool the motor part 1000 while moving toward the compression part 400, thereby improving cooling efficiency of the motor part 1000. Furthermore, the refrigerant can flow in a manner of surrounding the motor part 1000 by the plurality of insulating protrusions 1170, so as to cool the entire outer circumferential surface 1121 of the stator 1100, thereby further enhancing cooling efficiency.

Although the foregoing description has been given with reference to the preferred embodiment, it will be understood that those skilled in the art will be able to variously modify and change the present disclosure without departing from the scope of the disclosure described in the claims below.

What is claimed is:
1. An electric compressor, comprising:
a main housing extending in a lengthwise direction;
a motor part disposed in the main housing and comprising:
a stator comprising a rotor accommodating portion; and
a rotor rotatably disposed in the rotor accommodating portion of the stator;
a compression part rotatably connected to the motor part and configured to receive a rotational force from the motor part and compress a refrigerant; and
an inverter part electrically connected to the motor part and configured to apply power to the stator,
wherein the motor part is disposed in a motor room formed inside the main housing,
wherein the stator comprises a plurality of insulating protrusions protruding from an outer circumferential surface of the stator to increase a surface area of the outer circumferential surface,
wherein the plurality of insulating protrusions is configured to be brought into contact with an inner circumferential surface of the motor room,
wherein the outer circumferential surface comprises:
a first region comprising the plurality of insulating protrusions spaced apart from one another by a first predetermined distance; and
a second region comprising adjacent insulating protrusions, among the plurality of insulating protrusions, spaced apart from each other by a second predetermined distance different from the first predetermined distance,
wherein a coupling protrusion is configured to protrude inward from the inner circumferential surface of the motor room, and wherein the coupling protrusion is configured to be inserted into a coupling space formed between the adjacent insulating protrusions located in the second region and spaced apart from each other by the second predetermined distance, wherein the first region and the second region are asymmetrically formed with respect to an arbitrary straight line passing through a central axis of the stator on a cross-section of the stator, wherein the first region is formed in an upper semicircle and a part of a lower semicircle of the outer circumferential surface, and wherein the second region is formed in a part of the lower semicircle of the outer circumferential surface, and wherein the second predetermined distance between the adjacent insulating protrusions defining the coupling space is formed to be greater than the first predetermined distance between adjacent insulating protrusions located in the first region.

2. The electric compressor of claim 1, wherein the stator has a cylindrical shape extending in a lengthwise direction thereof, and wherein the plurality of insulating protrusions is configured to extend from the outer circumferential surface of the stator in the lengthwise direction of the stator, so that a refrigerant flows from the motor part toward the compression part through spaces formed by the plurality of insulating protrusions spaced apart from one another.

3. The electric compressor of claim 1, wherein an insulating unit is coupled to an end portion of the stator in the lengthwise direction of the stator, and wherein the insulating unit is configured to insulate the stator and comprises a cross-section corresponding to the stator.

4. The electric compressor of claim 3, wherein the stator comprises a coupling groove recessed by a predetermined distance into one side surface of the stator facing the insulating unit, and wherein the insulating unit comprises a second coupling protrusion protruding by the predetermined distance from one side surface of the insulating unit facing the stator, wherein the second coupling protrusion is configured to be inserted into the coupling groove.

5. The electric compressor of claim 4, wherein the stator comprises:

an outer circumferential portion defining an outer circumference of the stator; and a plurality of teeth protruding radially inward from the outer circumferential portion of the stator, wherein a plurality of coupling grooves is provided on one side surface of each of the plurality of teeth facing the insulating unit, and wherein a number of the plurality of coupling grooves formed in one of the plurality of teeth is different from a number of the plurality of coupling grooves formed in another one of the plurality of teeth.

6. The electric compressor of claim 5, wherein the insulating unit comprises: an insulation outer circumferential portion defining an outer circumference of the insulating unit; and a plurality of insulating teeth protruding radially inward from the insulation outer circumferential portion of the insulating unit, wherein a plurality of second coupling protrusions is provided on one side surface of each of the plurality of insulating teeth facing the stator, and a number of the plurality of second coupling protrusions formed on one of the plurality of insulating teeth is different from a number of the plurality of second coupling protrusions formed on another one of the plurality of insulating teeth.

7. The electric compressor of claim 6, wherein the insulation outer circumferential portion comprises a stepped portion protruding from the insulation outer circumferential portion toward an insulating housing, the stepped portion being configured to be brought into contact with an inner circumferential surface of the insulating housing when the insulating unit is coupled to the insulating housing.

8. The electric compressor of claim 7, wherein the stepped portion protrudes from the insulation outer circumferential portion by different lengths.

9. The electric compressor of claim 6, wherein the plurality of insulating teeth are spaced apart from one another, and wherein spaces formed between adjacent insulating teeth are configured to accommodate a plurality of coils wound around the plurality of insulating teeth.

10. The electric compressor of claim 3, further comprising an insulating housing configured to cover the insulating unit is coupled to an end portion of the stator in the lengthwise direction of the stator, and wherein the end portion of the stator is coupled with the insulating unit.

11. The electric compressor of claim 10, further comprising:

a coupling key protruding from one side of the insulating housing facing the insulating unit; and a coupling slot recessed into one side of the insulating unit facing the insulating housing, wherein the coupling key is configured to be inserted in the coupling slot when the insulating housing covers the insulating unit.

12. The electric compressor of claim 3, wherein the insulating unit is formed of a material with low thermal conductivity.

13. The electric compressor of claim 3, wherein the insulating unit comprises:

a first insulating portion coupled to the end portion of the stator facing the inverter part; and a second insulating portion coupled to another end portion of the stator opposite to the first insulating portion.

14. The electric compressor of claim 1, further comprising a connector unit configured to electrically connect the inverter part and the motor part, wherein the connector unit comprises:

a support member defining a body of the connector unit; and an electric member coupled to the support member in a penetrating manner, and wherein one side of the electric member is electrically connected to the inverter part, and another side of the electric member is electrically connected to the motor part.

15. The electric compressor of claim 14, further comprising a terminal unit detachably coupled to the another side of the electric member and configured to electrically connect the connector unit and the motor part, wherein an insulating unit is coupled to an end portion of the stator in the lengthwise direction of the stator, wherein the insulating unit is configured to insulate the stator and comprises a cross-section corresponding to the stator, wherein the insulating unit and an insulating housing configured to cover the insulating unit are sequentially coupled to the end portion of the stator in the lengthwise direction of the stator, and wherein a terminal accommodating portion is disposed in one side of the insulating housing facing the inverter part, the terminal accommodating portion comprising a space configured to accommodate the terminal unit.

16. The electric compressor of claim 15, further comprising a connector coupling portion disposed on one side of the inverter part facing the motor part, wherein the connector unit is detachably coupled to the connector coupling portion, and wherein the connector coupling portion comprises:

a support member insertion groove recessed by a predetermined distance, wherein the support member is configured to be coupled to the support member insertion groove; and an electric member insertion opening formed in a penetrating manner, wherein one side of the electric member is configured to be inserted in the electric member insertion opening.

17. The electric compressor of claim 16, wherein one side of the insulating housing facing the inverter part is configured to be brought into contact with one side of the inverter part facing the motor part when the connector unit is detachably coupled to the connector coupling portion.

18. The electric compressor of claim 15, wherein:

the insulating housing comprises a housing outer circumferential portion formed in a ring shape and defining a body of the insulating housing, a snap protrusion is configured to protrude radially inward from one end portion of the housing outer circumferential portion facing the stator, the insulating unit comprises an insulation outer circumferential portion defining an outer circumference of the insulating unit, a snap coupling portion is recessed radially inward from one end portion of the insulation outer circumferential portion facing the stator, and the snap protrusion is fitted to the snap coupling portion when the insulating housing is coupled the insulating unit.

* * * * *